US012302088B2

(12) United States Patent
Lyren et al.

(10) Patent No.: US 12,302,088 B2
(45) **Date of Patent: *May 13, 2025**

(54) BINAURAL SOUND IN VISUAL ENTERTAINMENT MEDIA

(71) Applicants: Philip Scott Lyren, Rincon, OR (US); Glen A. Norris, Lakewood, OH (US)

(72) Inventors: Philip Scott Lyren, Rincon, OR (US); Glen A. Norris, Lakewood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,161

(22) Filed: Jun. 28, 2024

(65) Prior Publication Data

US 2024/0357310 A1 Oct. 24, 2024

Related U.S. Application Data

(63) Continuation of application No. 18/128,299, filed on Mar. 30, 2023, now Pat. No. 12,028,702, which is a continuation of application No. 17/722,454, filed on Apr. 18, 2022, now Pat. No. 11,622,224, which is a continuation of application No. 16/297,663, filed on Mar. 10, 2019, now Pat. No. 11,317,235, which is a continuation of application No. 15/293,251, filed on Oct. 13, 2016, now Pat. No. 10,848,899.

(51) Int. Cl.
*H04S 7/00* (2006.01)
*H04S 1/00* (2006.01)

(52) U.S. Cl.
CPC .......... *H04S 7/304* (2013.01); *H04R 2499/11* (2013.01); *H04S 1/005* (2013.01); *H04S 1/007* (2013.01); *H04S 2400/01* (2013.01); *H04S 2400/11* (2013.01); *H04S 2400/13* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 9,396,588 | B1 * | 7/2016 | Li | G02B 27/017 |
| 2017/0269685 | A1 * | 9/2017 | Marks | A63F 13/212 |
| 2017/0295446 | A1 * | 10/2017 | Thagadur Shivappa | G06F 3/16 |

* cited by examiner

*Primary Examiner* — Duc Nguyen
*Assistant Examiner* — Assad Mohammed

(57) ABSTRACT

A method provides binaural sound to a listener while the listener watches a movie so sounds from the movie localize to a location of a character in the movie. Sound is convolved with head related transfer functions (HRTFs) of the listener, and the convolved sound is provided to the listener who wears a wearable electronic device.

20 Claims, 7 Drawing Sheets

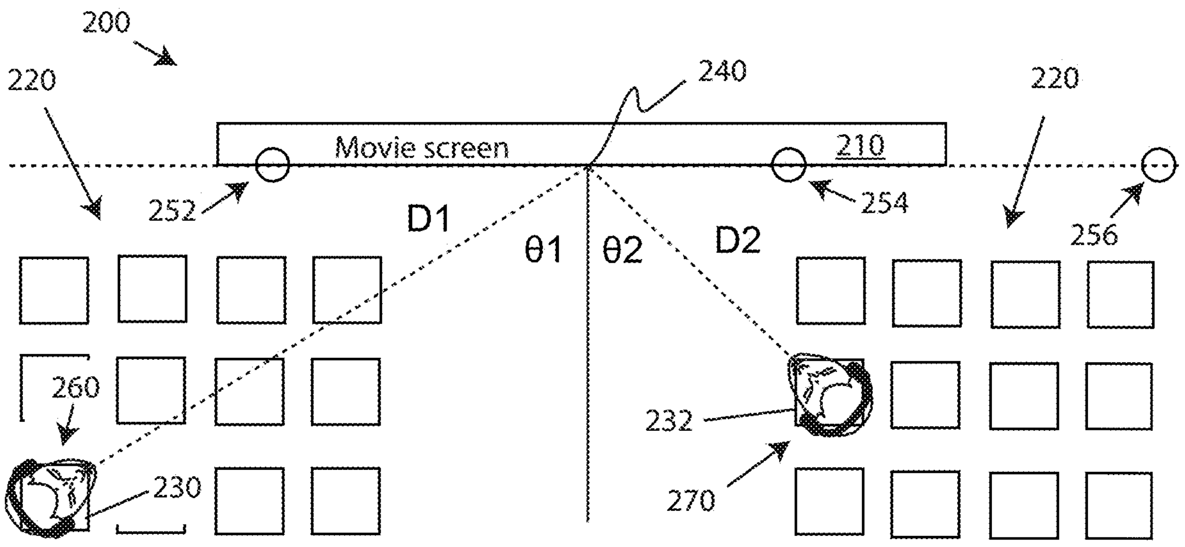

Figure 2

Provide the listener with an option to select or designate a character, object, or location for the point-of-view presented to a listener in a visual entertainment medium.
300

↓

Select a sound package that corresponds to the selected character or object, or to the selected location in the visual entertainment medium.
310

↓

Provide the visual entertainment medium to the listener with binaural sound adjusted according to the sound package so the listener hears the sounds as if the listener were the selected character or object, or at the selected location in the scene of the visual entertainment medium.
320

Figure 3

BINAURAL SOUND IN VISUAL ENTERTAINMENT MEDIA

BACKGROUND

Three-dimensional (3D) sound localization offers people a wealth of new technological avenues to not merely communicate with each other but also to communicate more efficiently with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIG. 2 is a movie theater for which sound is convolved for an individual according to a location of the individual in the movie theater in accordance with an example embodiment.

FIG. 3 is a method to provide sound to a listener based on a selected character, object, or a location in a visual entertainment medium in accordance with an example embodiment.

SUMMARY

Figure 1:
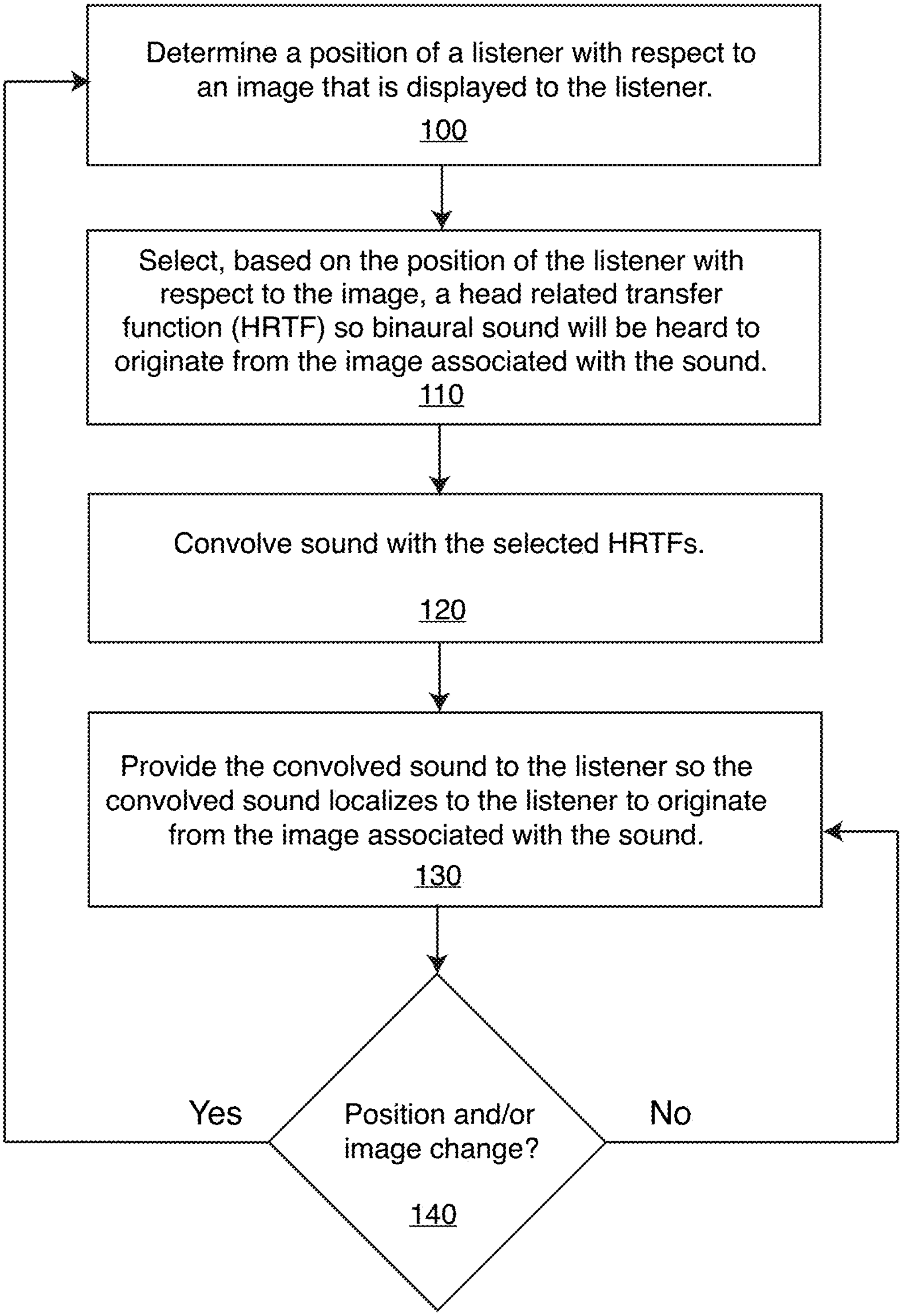
FIG. 1 is a method to convolve sound based on a position of a listener with respect to an image in accordance with an example embodiment.

One example embodiment is a method that provides binaural sound to a listener while the listener watches a movie so sounds from the movie localize to a location of a character in the movie. Sound is convolved with head related transfer functions (HRTFs) of the listener, and the convolved sound is provided to the listener who wears a wearable electronic device.

Other example embodiments are discussed herein.

DETAILED DESCRIPTION

Example embodiments include method and apparatus that provide binaural sound to a listener while the listener is viewing visual entertainment media.

Traditionally, stereo sound originates from speakers while a person engages in visual entertainment media, such as watching a movie in a cinema, watching a show on a television, playing a game on a computer, interacting in a virtual reality environment, etc. The visual experience or what the person sees is the primary medium that engages the person and provides the user experience while watching the movie, show, or other form of visual entertainment. The audio aspect of visual entertainment media commonly serves a secondary or supplementary role in the experience and provides background music or sound effects. For example, silent movies can deliver a complete experience without a soundtrack. Stereo sound is a welcome addition to visual entertainment, but such sound continues to merely supplement the visual aspect of the entertainment experience since the visual medium, using motion and perspective, can portray a manufactured reality with more realism than stereo sound.

One problem is that the stereo sound has limited sound localization or none at all. Stereo sound rarely achieves external localization for the listener. This fact significantly limits the user-experience when a person engages in visual entertainment. One limitation is the lack of spatialization of sound, which is less likely to convince a listener that the audible events are occurring around him. Another limitation is that, though sounds generated to accompany visual events displayed to the listener can be matched to the visual events temporally, the sounds cannot be matched spatially with any degree of realism. A viewer might see a character speaking on his TV screen, but he hears the words at the TV loudspeaker.

Example embodiments solve these problems and others by providing binaural sound with the visual entertainment. Binaural sound significantly adds to the user-experience and becomes a much more important contributor than stereo sound to the visual and the audio experiences.

With example embodiments, binaural sound greatly enlarges the area or space of the user-experience in the visual entertainment. With stereo or monophonic sounds, sounds originate at the loudspeaker, or inside the head of the user. By contrast with binaural sound, sounds can originate and localize from all around the user with these locations being outside the head of the user. The volume of space around the user becomes part of the user-experience since binaural sounds can be perceived to emanate or originate from locations throughout this external space.

Consider an example of a user watching a movie at a movie theater. Traditionally, the user would maintain his or her view fixed on the movie screen while listening to voices and sounds in stereo. If a movie character speaks, the user needs to see the image on the movie screen to monitor the faces of the characters in order to determine which character is speaking. The user-experience relies on sight and is limited to the physical dimensions of the screen. Example embodiments, however, vastly change and enlarge the user-experience. Binaural sound localizes voices of characters and other sounds to different locations on the screen and around the user. A user can determine who is speaking without the need of a visual reference since the location of where sound emanates can provide the user with information about an identity of the speaker. Example embodiments allow manufactured realistic environments for entertainment, education, communication, and other media in which the audio component plays a more significant role in the user-experience and assists in providing a more realistic and life-like experience.

Example embodiments expand the area of the user-experience beyond a screen to include the room, space, or virtual environment around the user. Binaural sounds can externalize to locations at the screen, near the screen, behind or beyond the screen, and away from the screen. Voices can appear behind the user, above the user, or next to the user.

Explosions and other sound effects can be perceived as originating in the theater itself. The user-experience enlarges beyond the screen and beyond the head of the user and includes the area surrounding physical locations of users. Sounds present in a scene can be localized around the viewer at the proper location corresponding to the geometry and layout of the scene without being limited to the size of the window on the scene currently displayed by the screen. The user has a richer and more realistic experience because the images on the screen making the sounds also serve as visual cues to assist in spatially localizing the sounds binaurally. Users can more easily suspend their disbelief to successfully imagine they are participants or bystanders in the story or scene being portrayed on the movie screen or other visual medium.

Expanding the area of the user experience with example embodiments is not limited to movie theaters but also includes other forms of visual entertainment. For example, the visual window or viewable area that includes 3D audio or binaural sound can be a movie theater screen, a television screen, computer monitor, a wall or screen or other surface onto which images are displayed or projected, a smartphone screen, a 160° arc screen that envelopes the viewer, a 360° theater screen, a head-mounted virtual reality (VR) screen, electronic glasses that augment the visual environment of the user, virtual areas, physical areas with augmented reality (AR), and other screens or visual displays.

With an example embodiment, supplying binaural sound for an entertainment, educational, simulation, remote viewing, telephony/videophony, or other visual presentation replaces or augments a user's audial environment and enhances the realism of the experience. Binaural sound or 3D localized sound can also reinforce or increase the perceived realism of the visual part of the experience occurring in the scene.

FIG. 1 is a method to convolve sound based on a position of a listener with respect to an image in accordance with an example embodiment.

Block 100 states determine a position of a listener with respect to an image that is displayed to the listener.

The image can be associated with a character or other sound source. For example, the image is a character that speaks in a movie, VR game, or other visual entertainment. As another example, the image is an object or location that is a source of sound, such as an explosion, a running machine, or other object or location that produces sound in the entertainment medium.

The position of the listener with respect to the image that is displayed to the listener can include one or more of a head orientation of the listener, a distance between the listener and the image associated with the sound, one or more angles between the listener and the image, and a general location of the image with respect to the listener (such as the image being in front of the listener, on a left side or a right side of the listener, above the listener, behind the listener, below the listener, near the listener, far from the listener, etc.). The angle or angles can include one or more of a measurement on the X-axis, Y-axis, and Z-axis or angles measured in spherical or polar coordinates.

In an example embodiment, a head-tracking device determines the head orientation of the listener. Head tracking can be part of a wearable electronic device (such as headphones, HMD, earphones, electronic glasses, etc.) or a device or process separate from the listener (e.g. software that determines a head orientation by analyzing images or video of the body and/or head of a listener from a camera located away from the listener).

The image associated with the sound can be visible to the listener during the visual entertainment being provided to the listener. For example, the image appears on a movie screen, appears on a display, or is perceived by the listener at a location in space with respect to the listener, such as being in a location in virtual reality (VR) or augmented reality (AR).

The image may also not be visually presented to the listener. For example, a source of the sound is thunder, a character present in the scene but beyond the frame of the camera, a voice of an unseen character (such as a character on the other side of a door, in another room, or at an unknown or hidden location), a person or animal that cannot be seen, a ghost or other imaginary figure, an approaching vehicle that is not visible, a sound from a machine in operation, a voice-over in a movie or game, a voice of a character in a dark room, etc.

Consider an example in which the image is of a person or character in a movie, and the listener is a viewer or watcher of the movie. The position of the listener with respect to the image is based on an actual, physical location of the listener and on the location of the person or character in the scene of the movie.

Consider another example in which the image is of a person or character in a VR game, and the listener views the person or character with a VR headset or other wearable electronic device. The position of the listener with respect to the image is based on a virtual location of the listener (e.g., where the listener perceives he or she is in the VR game) and on the listener's perceived location of the person or character in the VR game.

In an example embodiment, the listener is positioned at an origin, such as coordinates (0, 0, 0). The position of the image is determined with respect to this origin, which is the position of the listener. For example, the listener is at (0, 0, 0), and the image is at (1.3 m, 2.0 m, 0 m). As another example, the listener is at (0, 0, 0), and the image is at spherical coordinates ($r$, $\theta$, $\phi$), such as (1.5 m, 20°, 30°). Alternatively, the image is located at the origin, and the listener provided with a location with respect to the image. For example, the listener is at (5.5 m, 0°, 45°), and the image is at (0, 0, 0). Alternatively, both the listener and the image or images are located with respect to an origin or each other. For example, the listener is at (1.0 m, 0°, 0°) with respect to (0, 0, 0), and the image is at (2.0 m, 180°, 0°) with respect to (0, 0, 0). The positions of the image and listener are calculated with various other methods as well, such as methods using geometric equations and principles, trigonometric equations and principles, and other mathematical models.

Block 110 states select, based on the position of the listener with respect to the image, a head related transfer function (HRTF) so binaural sound will be heard to originate from the image associated with the sound.

Example embodiments are not limited to convolving, processing, moving, positioning, modifying, or localizing sound with HRTFs. Sound can be convolved, processed, moved, positioned, modified, or localized with one or more of an interaural time difference (ITD), an interaural level difference (ILD), a HRTF, a head related impulse response (HRIR), or another transfer function or impulse response. For example, altering the ITD between the left and the right speakers in the headphones or earphones of the listener changes the location where the listener localizes the sound. As another example, a set of HRTFs (i.e., a left HRTF and a right HRTF) for a known location with respect to the listener are selected so the sound convolved with the HRTFs that the listener hears appears to originate from or at the known location.

Consider an example in which sound localization points (SLPs) are assigned one or more of azimuth angles, elevation angles, and distances. These SLPs and their corresponding HRTF sets are calculated or interpolated in real-time or known by prearrangement and retrieved from memory. These SLPs can be associated with characters or objects or locations in a scene. For example, each position of a character in a scene at any instant or video frame has a known or determinable coordinate and orientation within the scene that is used as the SLP coordinate of the character at that instant. The camera's point-of-view also has a known coordinate, orientation, type of lens, degree of zoom, etc., at any instant. The positions or SLPs of the characters are calculated relative to the camera, or relative to each other, at any instant during the scene. The positions or SLPs of the character are also stored as coordinates relative to another character, to the camera, to any location in the scene, or to a common location relative to many scenes.

Consider an example scene in which each character has its own soundtrack where the voice of the character is stored, and the coordinates of the position of each character relative to the camera are tracked and recorded from frame-to-frame and stored in a time-coded data track. The coordinates of each character then serve as their SLP coordinates. The SLPs and respective voices of characters are then retrievable for any instant or frame in the scene. The soundtrack of a character is convolved with the HRTFs of a listener according to the coordinates or SLP of the character at the instant relative to the listener. This process provides the listener with localization of the voice of the character at the corresponding point in space relative to the camera or the view of the listener. Furthermore, these SLPs can be randomly located around the listener, spatially symmetric around the listener, located at predetermined locations (such as azimuth and/or elevation angles of a predetermined interval, such as) 5°, located at multiple positions about the listener, etc.

Each SLP is assigned a HRTF pair such that sound will localize to the SLP when the sound is convolved with the corresponding HRTFs. The computer system or electronic system (such as one or more processors located therein) calculates or determines the azimuth and/or elevation angles between the position and orientation of the listener and the image associated with the sound, and selects the corresponding HRTFs so sound localizes to the image location for the listener.

The computer system or electronic system also calculates or determines a distance between the listener and the image to select an appropriate HRTF, such as a near-field HRTF, or a far-field HRTF. Further yet, the sound is processed according to this distance (such as amplifying the sound, dampening the sound, etc., with a digital signal processor) so the loudness and perception of the sound to the listener is commensurate with the distance of the listener from the image or perceived distance from the character or object of the image. For example, the sound is commensurate with the plane of a movie screen where the image appears (e.g., 15 meters from a listener) or the distance to the perceived location of the character or object of the image (e.g., an approaching steam locomotive perceived by the listener as 200 meters from the listener even though the screen is 15 meters from the listener).

Consider an example in which a cartoon movie takes place in a two-dimensional (2D) world having height and width, but without depth, and is displayed on a 2D surface, such as a movie screen. The viewer interprets the plane of the movie screen as the location of the characters and actions. The characters and objects are confined to a single depth, at the plane of the movie screen. The computer system or electronic system calculates, determines, or knows the distance between the seated viewer and the location of the image of each character on the screen and accounts for the distance from the viewer to closer and farther regions of the screen as shown in FIG. 2.

Consider another example in which a viewer watches a movie that was filmed on a set or stage in a television (TV) studio using real people as characters and real furniture. The perspective of the images on the movie screen cause the viewer to interpret some characters and objects as nearer to the viewer and some characters and objects as farther from the viewer. The computer system or electronic system calculates, determines, or knows the distance from the perceived location of the viewer at, in, or relative to the scene (known as the camera position or point-of-view, or "camera") to the viewer's perceived location of the characters or objects in the scene. In addition, as in the example of the 2D world cartoon movie, the computer system or electronic system accounts for the distance between the viewer and the screen.

In the example above of the movie that takes place in a 2D world, viewers experience the distance between themselves and the characters in the scene as the distance between themselves and the movie screen. In an example above of the movie filmed on a stage, viewers experience the distance between themselves and the characters in the scene as a distance between the camera or point-of-view of the shot and the characters in the scene. Viewers can also determine distance based on sizes or heights of objects of a known size, or in relation to other displayed objects having a known size, with respect to the point-of-view of the viewer.

Consider another example in which a viewer watches a movie or a VR game in a virtual 3D room. For example, the viewer sees the movie on a plane away from the viewer such as a virtual movie screen or virtual monitor. As in the example of the movie filmed on a stage, the perspective of the images on the virtual movie screen cause the viewer to interpret some characters and objects as nearer to the viewer and some characters and objects as farther from the viewer. The computer system or electronic system calculates, determines, or knows the distance from the perceived location of the viewer at, in, or relative to the scene, to the viewer's perceived location of the characters or objects in the scene. In addition, as in the example of the 2D world movie, the computer system or electronic system accounts for the distance between the viewer and the virtual screen.

As another example, viewers of a different movie scene that takes place in a different 3D space experience the distance between themselves and the characters in the scene as a combination or function of both the distance between themselves and the screen and the distance between the camera or point-of-view of the shot and the characters in the scene. These distances can be determined based on relative sizes of objects in the scenes with respect to each other. Further, for linear perspective, a relationship between a distance to an object and apparent height of the object are inversely proportionate so the apparent height is equal to the size of the object divided by the distance of the object. As another example, the software application executing the movie or 3D visualizations has these distances stored in memory for various objects, characters, or locations that generate sound during the movie.

As another example, the computer system or electronic system executes one or more videogrammetry algorithms to analyze the images of the scenes in the visual entertainment medium in order to build, assemble, and/or maintain in memory a 3D model of the scene or sequence of events in the visual entertainment medium. The model includes sound sources positioned in the model at spatial coordinates measured or calculated from the images and/or audio of the visual entertainment medium. The 3D model also includes the positions of the camera and/or the viewer relative to the camera and/or screen. The computer system or electronic system refers to the coordinates of the character or sound source in the model in order to calculate the position of the character or sound source relative to the viewer. The computer system or electronic system also executes software that analyzes the model to determine positions of sound sources relative to walls in order to provide room impulse responses as discussed in block 140.

For example, a movie theater displaying the visual entertainment medium executes software with the computer system or electronic system that refers to one or more 3D models of the scene(s) in the visual entertainment medium in order to calculate the spatial coordinates of the visual entertainment medium sound sources relative to a viewer. The 3D model(s) are supplied with the visual entertainment medium. Alternatively (e.g., for a popular movie), the computer system or electronic system retrieves pre-built 3D models from a database. As another alternative, the computer system or electronic system executes photogrammetry algorithms that sample images or video frames from the visual entertainment medium in order to build and maintain the 3D models. For example, videogrammetry or photogrammetry software analyzes patterns in successive images of the visual entertainment medium to identify object points, and employs projective geometry to determine and assign 3D coordinates to the points. The videogrammetry software determines the position of the coordinates in the scene based on the locations of the images of the points on the film frame or the stored or displayed image. With the points assembled into a 3D model with assigned coordinates, the videogrammetry software determines the location and orientation of the camera exterior to the coordinates. The focal length of the lens and other geometric parameters of the images and model are determined by image analysis or retrieved (e.g., for visual entertainment shot or rendered with known equipment, lenses, etc.). The videogrammetry software examines additional observations to improve or confirm the accuracy of the model, such as scale bars or fix points of known distances (e.g., the height of a doorway or table) to connect the scale of the model with basic measuring units. Additional observations contributing to the assembly or accuracy of the 3D model are also gathered from analysis of the sound of the visual entertainment as discussed in connection with FIG. 4.

As another example, an electronic device worn by an individual viewer monitors the gaze of the individual. As a viewer focuses on an object or character in the scene, angles of the line-of-sight of the left eye and right eye of the viewer are measured in order to determine azimuth and elevation coordinates of the SLP or the character or object in the focus of the viewer. The distance coordinate for SLPs within ten meters can be calculated with the vergence angle (the relative angle between the left and right lines-of-sight) and the known intraocular distance of the viewer. The sound of the character or object is convolved with the HRTF pair of the viewer that corresponds to the SLP in order to produce for the viewer an externalized sound associated with the image at the SLP, the target of their gaze. The point of convergence is processed to dynamically determine which character or object the viewer is looking at, and to dynamically assign HRTF pairs for convolution of the sound of the character or object. As the character or object moves and the viewer continues to focus on the object, the lines-of-sight or changes in the lines-of-sight are measured and updated in order to continuously update the SLP location and HRTF pairs. Other methods of measuring or knowing for a viewer, a positional perception of a character or object in the visual entertainment are also used. Examples of such methods include, but are not limited to, processing a known defocus blur or stereopsis or analysis of ciliary muscle contraction or eye lens thickness due to accommodation. As another example, the computer system or electronic system employs more than one of these methods and/or other methods to deduce, calculate, measure, or determine the distance and location in a scene of a character or sound source relative to the listener/viewer.

Block 120 states convolve the sound with the selected HRTFs.

As noted, example embodiments are not limited to convolving the sound with HRTFs. Binaural sound can be produced by convolution or adjustment with HRIRs, RIRs, ITDs, ILDs, and other transfer functions or impulse responses and signal filtering to move or shape the sound. Further, as noted, the loudness of the sound can be adjusted to correspond to the distance between the listener and an image and/or the perceived location of the character or object of the image.

Block 130 states provide the convolved sound to the listener so the convolved sound localizes to the listener to originate from the image associated with the sound.

Binaural sound can be provided to the listener through bone conduction headphones, speakers of a wearable electronic device (e.g., headphones, earphones, electronic glasses, head mounted display, smartphone, etc.), or the binaural sound can be processed for crosstalk cancellation, provided as transaural sound, or through other types of speakers (e.g., dipole stereo speakers).

From the point-of-view of the listener, the sound originates or emanates from the image. For example, the computer system selects a SLP location at, on, or near the image, or the perceived location of the character or object of the image. When the sound is convolved with the HRTFs of a listener that correspond to the SLP, then the sound appears to originate to the listener at the SLP or image.

Block 140 makes a determination as to whether the position of the listener and/or image has changed. If the answer to this determination is "yes" then flow proceeds back to block 100. If the answer to this determination is "no" then flow returns to block 130.

The SLP can be altered upon the occurrence of a change in the position of the image associated with the sound with respect to the listener (e.g., the image moves), a change in the position of the listener with respect to the image (e.g., the listener moves), or a change in both positions (e.g., the image and the listener move). The SLP can also be altered upon the occurrence of other changes, such as a change in the point-of-view of the listener, change in camera angle, focal length or zoom, depth of field, change in viewing angle, etc.

Consider an example in which a user wears a wearable electronic device (e.g., wireless earphones) and watches a movie (such as a feature length film) at a public movie theater. The movie theater provides binaural sound to the user during the movie so sound localizes to the user at different locations in the movie theater, such as locations on the movie screen, locations in front of the user (e.g., locations in empty space or unoccupied space between the user and the movie screen), locations above the user (e.g., a location in empty space or unoccupied space that is one meter above a top of a head of the user), and other locations (e.g., locations next to the user or behind the user). While the movie plays in the movie theater, a computer system or electronic system determines a head orientation of the user with respect to a character that is displayed to the user on the movie screen (e.g., the user wears a head tracking device that communicates the head orientation of the user to a processing unit of the computer system). The computer system selects, based on the head orientation of the user with respect to the character, a left and a right head related transfer function (HRTF) so a voice of the character is heard to originate to the user from the location of the image of the character on the movie screen. The selected HRTF pair is stored with or supplied by the computer system or electronic system.

For example, a Sound Localization System (SLS) or SLP Selector derives the SLP for a sound source relative to a user and communicates the coordinates of the SLP to a wearable electronic device (WED) worn by the user. The HRTF pair of the user is retrieved from the WED or from storage (e.g., online or cloud storage), and the WED performs the convolution. For example, the WED belongs to the user and includes the custom HRTFs of the user. As another example, the WED is loaned or provided to the user by the theater and the HRTFs are stock HRTFs, or the HRTFs are retrieved from the WED or portable electronic device (PED) of the user (such as a smartphone of the user), and the computer system executes the convolution. For example, the WED or PED convolves (e.g., with a digital signal processor) the voice of the character with the left and the right HRTFs and provides the convolved sound to the user. This convolution occurs in real-time while the user watches the visual entertainment medium or can occur before the user watches the visual entertainment medium.

The convolved sound is provided to the user through the wearable electronic device (or speakers with cross-talk cancellation) so that the voice of the character localizes to the user as originating from the image of the character that is located on the movie screen. The computer system or electronic system such as in a movie theater or an electronic device (e.g., a smartphone or WED) of the user execute the convolution. The computer system or electronic system determines the location and orientation of the user with respect to a location on a screen or other visual output device, such as a movie screen or TV screen.

In an example embodiment, the computer system includes one or more electronic devices with or on the user. The location and orientation of the user with respect to a character or sound source in a scene is determined by the computer system or electronic system such as a computer system executing in or at a movie theater on behalf of multiple users, or computer system in a PED carried by a user. The computer system or electronic system calculates an SLP for the character or sound source for the user from the coordinates of one or more of the following: the location and orientation of a character, object or sound source in the scene relative to the point-of-view of the camera; the location and orientation of the user with respect to the screen or output device or point-of-view of the camera; and the location and orientation of the image of a character, object or sound source in a scene as perceived by a user.

In the example of the user going to view the movie at the public movie theater, the voice of the character originates from the location of the character where the character is displayed or projected on the movie screen. Thus, from the point-of-view of the user, the voice of the character externally localizes to the location of the character. This localization differs significantly from sound being provided to the user in stereo sound, such as sound being provided to the user in DOLBY sound through multiple speakers in a public movie theater. When the sound is provided in stereo, the sound emanates from the location of the speakers, not from the location of the character displayed on the movie screen. By stark contrast, binaural sound is provided to the user through earphones, headphones, or speakers with crosstalk cancellation, and the voice of the character is heard to originate to the user from the location where the character is seen on the movie screen.

Consider an example where a 3D model of a set or scene of the visual entertainment medium is created by the computer system or electronic system in real-time or retrieved in advance of playing to the viewer. For example, a 3D model of a set of a popular television (TV) program is retrieved online from fans such as other users who create and share the 3D model for the purpose of generating binaural audio of the visual entertainment medium. Consider an example in which the visual entertainment medium frequently or commonly includes scenes that take place on a single set such as an apartment of a main character in a situation comedy TV show, and the computer system or electronic system has access to a 3D model of the set or scene retrieved online or assembled by software. The computer system or electronic system populates the 3D model of the set or scene with the characters and other sound sources from scene to scene of the visual entertainment medium. For example, the computer system or electronic system software analyzes the images and voices of a scene set in a known 3D space with known characters in order to identify the characters and determine and update their location in the scene, and the position of the camera, at a particular moment or time-code. For example, the computer system uses object recognition to identify characters (e.g., people), stores the characters in a table, such as a character table. The computer system executes videogrammetry to determine 3D coordinates of the characters in the scene, stores the coordinates in the character table, and places the characters in the 3D model at the coordinates. The computer system executes facial recognition on the images of the characters and stores the facial identifiers in the character table. When a character speaks, the computer system performs voice recognition on the speech of the character in order to correlate the speech with a character that is identified as speaking (e.g., the mouth of the character is in motion). The character table is populated this way over time and eventually includes a facial identity and a vocal identity for the characters, and the current locations and orientations of the characters in the model. Alternatively, the character table is provided or populated in advance with correlations between character identity and voice identity. Then, even as the camera changes position and orientation for different shots within the room of the scene, the computer system or electronic system refers to the existing updated model in memory to calculate the SLP coordinates of the characters relative to the viewer and relative to the camera. When a character speaks, the computer system performs a lookup on the character table with the voice identity in order to retrieve the coordinates of the origin of the voice in the model. The computer system includes the coordinates in the calculation of the SLP coordinates of the voice to convolve the voice for the user.

For example, the computer system or electronic system determines the size and shape of the room, including relative locations of walls, ceiling, floor, objects, etc., relative to the characters or sound sources and camera. The computer system or electronic system executes object recognition software to determine or identify objects and their relative positions with respect to each other in the 3D model. Further, the computer system or electronic system calculates, determines, retrieves, or approximates room impulse responses (RIRs) by referring to the 3D model or room/environment or a similar 3D model or environment. The computer system or electronic system convolves the sounds of the characters with the respective RIRs for their positions and orientations. The computer system or electronic system also executes ray tracing in the model for the sounds of the characters at their known positions within the 3D model in order to render for the viewer the sound with the RIRs.

In example embodiments, binaural sound is provided to a user so the sound localizes to a sound localization point (SLP) that is in empty space that is not occupied by a tangible object (e.g., a physical object with real substance that can be touched and felt). By way of example, an empty space location or area would be void of physical objects (e.g., touchable physical objects). For instance, if a user sits in a public movie theater with a ceiling that is twenty feet high, then the area above the top of the head of the user to the ceiling would be empty space. Although this space includes air, the space does not include a tangible object.

Binaural sound can be processed or convolved to localize to these empty areas (e.g., processed so a SLP is located one meter above the head of the user in empty space). Consider another example in which a user sits in a couch that is spaced ten feet in front of a television. No tangible objects exist between the line-of-sight of the user and the television while the user is seated in the couch; otherwise, the user would not be able to clearly see the television. This area is empty or unoccupied space. Binaural sound can be convolved to localize to a point or area in this empty or unoccupied space.

Consider an example in which sound localizes to a user to a location behind the user. This location is a point or area that is in empty space behind a head orientation or line-of-sight of the user. For example, this location has an azimuth angle with a value in a range between 135° to 225° when a line-of-sight of the user is an azimuth angle of 0°. As another example, sound localizing behind a user is positioned behind the shoulders of a user and independent of head orientation, such as with an azimuth angle value in a range between 100° to 260° when a line-of-sight of the user or line normal to a chest of the user is an azimuth angle of 0°.

Consider another example in which a user wears headphones or earphones while watching a movie in a movie theater. The user hears binaural and stereo sound of the movie through the headphones. A particular scene of the movie depicts a person who is five feet tall, facing the camera, and leaning on a wall that is parallel to the camera lens. The scene is projected so that the scale of the image of the person is life-size and his body image measured at the movie screen is five feet tall. To a first user seated 10 meters from the image of the person on the screen, the person in the scene appears to be 10 meters away from the location of the user. To a second user seated 20 meters from the image of the person on the screen, the person in the scene appears to be 20 meters away. When the person in the movie scene speaks, the voice of his or her character is heard to originate from the surface of the movie screen at the location where the image of the character appears on the movie screen for both the first user and the second user. The sound thus emanates or originates to the first and second users from a specific location of the image of the movie and screen. This location is not in empty space since the sound localizes to a SLP that is at a physical object that is the movie screen in this example. Further, the sound has a volume or loudness consistent with that of a person speaking 10 and 20 meters away, respectively, as if the users were indeed located at the scene depicted in the movie.

Consider another example in which movie scenes are projected at scales different than life-size. These scenes include action and characters that produce sounds at multiple and changing depths of field. SLPs are selected for each sound source at the image associated with the sound and for each location and head orientation of the user. Premixed sound is delivered with a prearranged normalized volume. Volumes of individual sound sources are scaled according to the perceived distance of the objects or characters of the image, and a rule set can be applied to the scaling. For example, a soundtrack of the bark associated with the image of a dog character is set to vary inversely with the square of the distance from the dog to the camera, with a moderate volume of "5" for a distance of 5 meters, and an upper limit of "9." When the dog runs away from the camera into the distance, the volume is scaled down according to the distance of the dog from the camera (e.g., the distance coordinate of the SLP of the dog is set to the distance of the dog from the camera, or the volume is scaled according to the size of the image of the body of the dog, or another way). The listeners would hear the volume of the barking sound decrease as the dog ran away. Later, the dog returns toward the camera lens to a close-up shot and barks. A corresponding scaled volume might be too loud for listener comfort, but the rule set ensures that the volume does not exceed a level of "9."

Consider further the example above with the dog in the movie scene. A volume of the voice of the dog owner character is set to remain at level "5" so that the listener hears the intelligible speech of the dog owner even when the dog owner is far from the camera in the scene and the image of the dog owner is small. This example shows that rule sets for volumes can be different for different sound sources and for different scenes.

Typically, movie theaters play sound at levels louder than the sound would be heard in a corresponding real world situation (such as the volume of the sounds captured at the movie set when filming a scene). Sound is played at higher volumes to compensate for the persons seated farthest from the speakers, for persons with lower hearing acuity, and for ambient noise in the theater, such as noisy patrons. Playing sound at these higher levels, however, may not be welcome by all listeners.

An example embodiment solves this problem of playing sound too loudly for some listeners in a movie theater. By providing the binaural sound to listeners via headphones or other wearable electronic devices, the listeners enjoy the benefit of isolation from unwanted ambient sound. The isolation also eliminates the need for an exaggerated volume or loudness. Listeners select or adjust a volume according to their individual preference.

This listening experience in an example embodiment of a movie theater is quite different than a traditional listening experience in a movie theater. Traditionally, listeners in the movie theater are not able to localize sound. Instead, sound originates from multiple speakers located at the perimeter of the theater, such as DOLBY surround sound. Movie soundtracks when listened to with headphones may include sound sources panned to the left or right, but do not provide the user with externalization. With theater speakers and headphones, voices and other sounds do not originate at the location of specific people, objects, audible events, or specific identifiable positions in space.

An example embodiment solves this problem and improves the listening experience in movie theaters and visual entertainment since sounds originate from specific, identifiable characters, objects, points in space and/or locations.

Further, in an example embodiment, each individual listener has sound convolved to the individual listener and/or the position or location and orientation of the listener (whether this position is an actual, physical location of the listener or the virtual location of the listener). For example, two or more listeners simultaneously watching a same movie at a same time in a same movie theater have sound convolved with their unique or individual HRTFs. The sound is convolved for each specific location of each listener or for locations of groups of listeners. For instance, sound convolves for groups of listeners at a common location or area in a movie theater. Alternatively, sound convolves differently for each listener.

Sound can also move with or follow an image. For example, when the image of the character on the movie screen moves across the screen, the voice of this character also moves so the listener continues to hear the voice of the character from the location of the image of the character on the movie screen. For instance, when the character is on a right side of the screen, the voice of the character originates from the character on the right side of the screen. After the character moves or appears on the left side of the screen, then the voice of the character originates from the character on the left side of the screen where the image of the character is located.

By way of example, the computer system or electronic system continually, continuously, or periodically executes one or more blocks of FIG. 1 so the selected SLP follows or tracks the movement of the image.

FIG. 2 is a movie theater 200 in which sound is convolved according to a location of an individual in the movie theater in accordance with an example embodiment.

The movie theater 200 includes a movie screen 210 and a plurality of seats 220. A position of each seat with respect to the screen can be calculated and known in advance. For example, seat 230 has a distance D1 and an angle θ1 to a center location 240; seat 232 has a distance D2 and an angle θ2 to the center location 240; etc. This distance and angle can also be calculated for different locations on the screen, not just the center location. In this manner, when an image appears on the screen the distance (D) and angle (θ) can be known for each seat in the movie theater and for each location on the screen for each seat. Similarly, elevation angles for seats (such as a ϕ1 and ϕ2) can be calculated for each seat to various locations on the screen.

For illustration, FIG. 2 shows two people in the movie theater wearing a wearable electronic device. Each person at the movie theater is provided with an individualized or unique externalized sound localization experience according to their position and head orientation in the theater and character or sound source image locations on the screen since the distance (D) and angles (θ, ϕ) are known for each seat and for each location on the movie screen. Sound is convolved for each listener in the movie theater so the sounds appear to localize from or at or in the direction of the corresponding images appearing on the movie screen or other desired locations in the movie (such as locations behind the screen, above the screen beside the screen, in front of the screen, etc.). This audio experience significantly differs from a traditional movie experience in which sound internalizes to a stereophonic position associated to but independent of the visual representation of the sound source.

The distance (D) can be based on the actual, physical distance from a listener to a position at the display or screen. Alternatively, this distance can be from the listener's perceived location with respect to the scene to a perceived location of the character or object of the image in the scene. This latter instance would occur when the distance is being calculated or estimated to the location, object, or character in the space of the visual entertainment, such as the distance the listener would perceive if he or she were a character in the scene of the visual entertainment. For instance, a close-up shot of a face of a character would appear to be closer to the listener than a distance shot of the same character.

An example embodiment adjusts the loudness of the sound provided to the listener based on the actual distance between the listener and the image on the display or screen, or the distance between the listener's perceived location with respect to the scene and the perceived location in the scene of the character or sound source.

Consider an example wherein the scene of the visual entertainment medium includes a character positioned in the scene away from the camera, and this perceived distance away from the camera is determined to be 20 feet. A viewer sits 30 feet from the screen. For some types of scenes, a viewer can benefit or experience greater realism if the distance of the SLP is set to 30 feet. For other types of scenes or shots, a more realistic experience is perceived with a SLP 20 feet from the viewer, and for other shots or circumstances a best realism or experience is achieved by placing the SLP at a distance of 50 feet from the viewer. Further, by analyzing a response of a viewer to the image of the character such as a gaze or focus of a viewer as discussed herein, the distance of the character from the viewer as perceived by the viewer is determined to be 25 feet, and for some scenes, this distance of 25 feet provides the best location for the SLP of the character. Each type of scene is accommodated.

One problem with visual entertainment is that typically a viewer sees an image of a speaking character emanate from a screen, but hears the voice of the character emanate at a location apart from and independent of the image location, such as sound emanating at loudspeaker in the theater or emanating as stereo sound in headphones. Associating audial and visual percepts from independent locations for a single auditory event is contrary to the experience of physical reality. In physical reality, sound usually emanates from the location of the physical event that causes the sound, just as the visual perception of the event appears at the location of the physical event. Our experience in physical reality is usually of localizing the sound of an event at the spot where we see the event, so the event and the SLP are witnessed at the same location in space. Therefore, most visual entertainment lacks realism due to providing the visual and auditory percepts of a single event at separate locations.

To improve the realism of the movie experience, binaural sound is provided to each viewer at their respective seats in order to connect in space the sound with the causal event so that the sound and the visual action resulting from an event are perceived to occur at the same location. Providing sound in this manner presents a more realistic experience that reflects how people typically experience events in their environment.

Alice 260 and Bob 270 face the center of the screen 240 and visually perceive two people or actors 252, 254 talking. The SLPs of the speech of the two actors occur at the images of the actors on the screen. Alice hears speech at 252 at the same time she sees the mouth of the actor move at 252. Bob, who is seated at a different location away from Alice, also hears speech at 252 at the same time he sees the mouth of the actor move at 252.

In order to achieve this effect, the speech is convolved for Alice with the pair of Alice's HRTFs or ITDs/ILDs corresponding to the coordinates of 252 relative to her head at 230. The speech for Bob is convolved with the pair of Bob's HRTFs or ITDs/ILDs corresponding to the different coordinates of 252 relative to his head at different location 232. In this way, Alice and Bob both hear sound originating from the image of the actor on the screen even though Alice and Bob are located at two different locations in the movie theater. This audio experience increases the realism for the viewers since sounds localize at the visual event on the screen. Viewers can feel or experience being at the location of a scene since the sounds of the speech emanate from the location of the mouths of the actors.

Sounds other than voice also localize to locations on the screen or other locations. Presenting both the visual and auditory percepts of an event at a common point in space or on the screen increases the realism of the experience.

In an example embodiment, off-screen sounds externally localize to the listener. In this instance, images or sound sources that are not currently being displayed on the screen localize to coordinates off the screen but consistent with the scene. In this way, realism of the listening experience is maintained. If sounds are not externally localized during the visual entertainment, the realism of the listening experience can be hindered.

In another example embodiment, off-screen sound sources localize to another location inside the head of the listener or above the listener, and some sounds are externally localized. For example, a voice-over of a character during a movie or game internally localizes to the viewers while other sounds externally localize to the viewers. In this instance, the viewer can easily distinguish the internally localized voice of a narrator in the movie or game from the voices of characters.

Consider the following example: Alice and Bob hear the voice of one actor 256 but cannot see him because his image was not included in the shot (e.g., the actor was outside the video frame when the shot was captured at the movie set, edited out of the scene, or not displayed to the viewer). The voice of the actor 256 cannot be localized at an actual image of the actor because the actual image of the actor is not currently visible to the viewer. The actor 256 does have a location in the scene relative to the other actors, such as beside them, just outside of the shot, a voice on the other side of a wall in the scene, or other location. Although the SLP for the voice of this unseen actor 256 cannot be localized to an actual image of the actor currently on the screen, the SLP is still be localized in space relative to the other SLPs, such as the actors or objects actually on the screen.

For example, the SLP of the voice of the unseen actor 256 is localized to the same plane as the movie screen 210 as shown by the position of 256. This location can be a spot on the wall that includes the movie screen, or depending on the shape and size of the theater, this location can be beyond a wall or at a point in empty space (e.g., a location within a few feet or a few meters of the screen). For instance, the SLP of the unseen actor 256 is behind the viewers, to one side of the viewers, or above the viewers. Whether the location of this SLP is coincident with a wall or behind a wall or in empty space does not compromise the realism of the visual entertainment experience for the viewer because the location of the SLP is consistent with the visible scene or consistent with SLPs of other sounds that the viewer hears. For example, the location of the SLP is consistent with the relative locations of the images 252 and 254 (which are being displayed) or the relative location of actions on the screen, such as actors in the movie looking in a direction of where the sound originates from the unseen actor.

The SLP of a sound resulting from an off-screen or out-of-frame sound source can be confined to a plane of on-screen SLPs. The SLP can also be positioned in other locations around the viewer. For example, when the position of the SLP is perceived as consistent with the positions of on-screen SLPs or actions of on-screen images, then the realism or accuracy perceived by the viewer is increased. In this manner, even though the field-of-view of the viewer is limited by the screen, the 3D audio space has a size and volume that can extend beyond the field-of-view. For instance, the 3D audio space includes areas beyond the perimeter of a screen, beyond the plane of a screen, above the viewer, behind the viewer, below the viewer, or other locations that are not currently in the field-of-view of the viewer.

Consider an example in which a screen is in the shape of a curving plane that arcs partially or fully around the viewer, and the SLP of an off-screen sound source is consistent with the spatial geometry employed by the curved screen but outside the current field-of-view of the viewer.

An example embodiment represents a significant improvement over traditional forms of visual entertainment and information delivery to users. Employing binaural sound localization in visual entertainment or education with an example embodiment increases the economy of storytelling and information delivery. By reducing the need to establish much of the narrative or other information visually, narration and information delivery is more dense or compact and can be understood more quickly. Furthermore, the time and cost of storytelling and communication in the visual entertainment medium, and its preparation, is reduced. For example, consider a scene in which the camera or point-of-view approaches and enters a room straight through a doorway until the doorway is no longer in view, and then the sound of a closing door is heard. A viewer understands that the sound of the door originates from the off-screen, out-of-frame, or off-display event since the viewer understands the relative location of the door in the scene. In traditional visual entertainment, this understanding of the location of the door is dependent on the shot that first establishes the location of the door by showing the doorway. Without the establishing shot, a viewer could errantly assume that a door in another part of the scene has closed and miss the significance of an unknown power eliminating a retreat from the room. By supplying the sound of the closing door in binaural sound, the establishing shot of the door, the associated time and expense of shooting it, and the several seconds occupied by the duration of the shot in the narrative, is not necessary. A viewer facing the screen or display cannot see or expect the closing door but can localize the binaural sound of the door behind them. In this instance, realism and economy of the viewing experience are enhanced since the localization of the sound by the viewer communicates to the viewer both the event of a closing door and the location of the door that is consistent with the current view, even if a doorway was never shown.

In an example embodiment, a position of actors, characters, or other sound sources on a screen or other display are determined and used to calculate an azimuth angle, elevation angle, and/or distance with respect to the viewer and/or camera. As one example, object recognition software determines or identifies objects and their relative positions with respect to each other and/or positions in a frame or display. For instance, given a known frame height and width, a relative position of an object from an edge or side of the frame is determined. As another example, a frame or display is divided into multiple imaginary sections, segments, or portions, such as dividing the frame or display into horizontal or vertical zones or areas. A determination is made as to which zone includes a particular sound source, and viewer angles or positions are determined with respect to the identified zone. As another example, positions of the sound sources are entered or determined during filming, during editing, or after filming or shooting. For instance, a matrix or grid overlays the frame, display, or viewable area. Each source of sound is associated with a matrix or grid location, and viewer angles are calculated from these matrix or grid locations. As one example, a center or middle of the frame, display, or viewable area is provided as an origin, and sources of sound are determined with respect to this origin. As yet another example, locations of sound are determined with respect to a general location of the screen. For instance, sounds that localize off-screen are provided as locations relative to the screen, such as behind the screen, to the right of the screen, to the left of the screen, above the screen, etc.

Furthermore, different viewers can simultaneously hear same sounds but localize them to different locations. For example, one viewer localizes an off-screen sound to the left of the screen; another viewer simultaneously localizes the same sound above the screen; and another viewer simultaneously localizes the same sound to the right of screen. This situation provides each viewer a unique audio experience while watching the same video since each viewer can hear events or hear characters talking from different locations.

Consider an example in which viewers are watching a scary movie at a movie theater. During the movie, a voice of a ghost is heard. The SLP coordinates of the voice supplied by the computer system or electronic system to each viewer need not be consistent with a single scene location. For example, the computer system or electronic system deliver random coordinates. One viewer in the movie theater hears the voice of the ghost originate from the movie screen; another viewer hears the voice of the ghost originate from behind them; another viewer hears the voice of the ghost originate above them; another viewer hears the voice of the ghost originate from the chair or person beside them; etc. When the voice of the ghost is heard, members of the audience may witness other viewers looking in various directions around them, contributing to shock, confusion, and fright during the movie. SLP coordinates delivered to viewers can be random, consistent with a character location in a scene, a function of a screen or theater size or shape, a function of the proximity of other viewers, a gender of a viewer, a location or zone of a viewer within the theater or viewing environment, proximity of a viewer to a screen, a type of or property of a PED or other hardware, a time of day, or other data available to the computer system or electronic system, and combinations thereof.

As discussed, the computer system or electronic system determines a location of a viewer relative to a screen or visual display. For example, a server in the electronic system and in communication with a WED determines the location of the viewer relative to a screen or visual display. As another example, a PED of a viewer determines a location of the viewer relative to a screen or visual display. For example, a range-finding application executing with the PED reports or returns the distance from the viewer to the screen or visual display.

Consider a movie with a single character or sound source. The coordinates of the SLP of the character or sound source are calculated or determined by image analysis or other methods such as those mentioned in block 110 and elsewhere herein. HRTFs corresponding to the coordinates of the SLP are stored with, supplied by, or retrieved by the PED. A PED of a viewer then convolves the single sound source. In this way, a viewer experiences external localization of the sound of the character at a location in empty space corresponding to the location of the sound source in the scene of the visual entertainment medium. In this example the PED of the viewer, provided with access to the audio and visual components of the visual entertainment medium, accomplishes the processing necessary to provide binaural sound of the visual entertainment medium to the viewer relative to the location of the viewer with respect to the screen or visual output device. Consider further examples wherein the visual entertainment medium includes multiple characters and sound sources in the scene of the visual entertainment medium.

The location of listeners relative to the screen or relative to the visual and/or audial space are monitored. For example, a listener moves to another seat or another location with respect to the screen or display; a listener moves in a VR space while playing a game; or a listener moves during a teleconference supplemented with AR images of participants. The HRTFs are changed after or during the movement of a listener to change the localization of the sounds in order to compensate for the movement of the listener. In addition, the orientation of the head of a listener is tracked relative to the screen or visual and/or audial space, and the HRTFs are changed during the head movement to change the localization of the sounds in order to compensate for the head orientation. For example, a listener watches a dialog between a character on the left side of the screen and a character on the right side of the screen, and the listener rotates his head back and forth to face the image of each character when they speak. The angle of azimuth of the image of a character while speaking, relative to the face of the listener, is measured to be 0° (the listener faces the character). In a traditional stereo sound source, even if the listener turns their head to face the speaking character, the voice of the character remains fixed in the stereo pan off to one side and hinders a realistic experience. However, realism is provided by the binaural sound of the voice of the speaker adjusted to the head orientation of the listener by the computer system or electronic system wherein the voice of a character a listener faces is heard to originate at 0° azimuth and not off one side.

As noted, one problem with traditional television, movie, and other forms of visual entertainment is that the listener is merely a viewer of the visual entertainment with audio supplemented in stereo or other multichannel/multi-speaker sound. The level of realism that an audience member experiences is limited in part because an audience member is limited to a third-person point-of-view. The audience is limited to a third-person point-of-view because the spatial location of the visual action is limited to the area of the screen and/or because the spatial location of an auditory event is limited to the stereo pan, locations of mounted loudspeakers, or other localization that does not spatially integrate or match with the visual action.

An example embodiment solves this problem by enabling listeners to be immersed in the space of the visual entertainment, and by allowing an audial point-of-view within the scene. Listeners can hear the sounds as if they were at the location of the scene of the visual entertainment or as if they were participants in the visual entertainment. For example, a listener hears sounds from a point-of-view of a location, person, or character in or at the scene of the visual entertainment. In this manner, the listener perceives his or her physical location as being at the location, person, or character of the scene of the visual entertainment since the listener hears audio that the listener would have heard or would hear if the listener were actually, physically at the location of the captured or manufactured scene in the visual entertainment. A 3D audio world that surrounds a user and spatially integrates with the visual presentation can reduce or eliminate a third-person outsider perception and can also provide an effective first-person viewpoint. This type of listening experience using binaural sound represents a significant departure from the traditional listening experience in which listeners hear the sounds of the visual entertainment in stereo separately from the visual scene.

In one example embodiment, listeners select a character, object, or a location in the visual entertainment and then hear the sounds as if they are the character or object, or as if they are at the location as the scene occurs. For example, a user selects a character in the movie or in a VR game. The user then hears the sounds of the movie or game from the point-of-view of the character, as if the user were the character in the movie or the VR game. In this manner, the user can more easily believe that he or she is in another place. The user therefore has a more realistic experience during the visual entertainment.

Consider an example in which a listener elects to be a character named Alex in a VR game or feature length film. During a scene, Alex walks along a city sidewalk, and another character named Ben also walks on the sidewalk behind Alex. Ben calls Alex's name to get his attention. The character Alex would hear the voice of Ben from behind since Ben is located behind Alex. The listener would also hear this voice of Ben calling to Alex from behind the listener since the listener experiences sounds from the point-of-view of the character which, in this instance, is Alex.

In order to enable listeners to experience the point-of-view of characters, objects, or locations in a visual entertainment, the audial cues of the sounds included in the scene of the visual entertainment are adjusted or captured to provide the listener with the sounds relative to the selected character, object, or location. Consider an example in which the sound is desired to emanate from behind the listener. For example, the sound is convolved with a pair of HRTFs of the listener so the sound emanates from behind the listener. As another example, the interaural time difference (ITD) or interaural level difference (ILD) of the voice is altered so the emanation of the voice is consistent with a position from behind the listener. As another example, the voice is uttered from behind the character and captured binaurally (e.g., using dual microphones in or at the ears of the actor playing the character), such that the voice originates from behind the character. This sound is provided to the listener and originates from behind the listener. As yet another example, the voice uttered from behind the character is captured with a dummy head (e.g., using dual microphones in the ears of the dummy head) representing the character. This sound is provided to the listener and originates from behind the listener.

FIG. 3 is a method to provide sound to a listener based on a selected character, object or a location in a visual entertainment medium in accordance with an example embodiment.

Block 300 states provide the listener with an option to select or designate a character, object, or location for the point-of-view presented to a listener in a visual entertainment medium.

The listener can select from or be provided with one or more characters, objects, or locations in the visual entertainment medium. For example, the listener selects the vantage point of a main character in a TV show or a main character in a VR game. As another example, the listener selects a location in the scene of the entertainment medium from where the listener will hear sounds of interest to the listener, such as a location beside two conversing spy characters. For instance, the listener will hear voices and other sounds as if the listener were located in the scene of the entertainment medium at the selected location. As another example, the listener selects a seat at a virtual conference table during a telephone call within a VR game or while executing a VR or AR telephony application.

Alternatively, the listener does not select a character or location but instead is provided with a character, location, or point-of-view in the entertainment medium without the listener making the selection. For example, the designation is made for the listener by a movie studio, game programmer, editor, another player, intelligent user agent (IUA) of the listener, intelligent personal assistant (IPA) of another player, an electronic device, a software program, a rule set associated with the physical or virtual space, or another person or sound source.

Block 310 states select a sound package that corresponds to the selected character or object, or to the selected location in the visual entertainment medium.

The sound package provides sounds, data, and/or information to adjust sounds in order to provide a listener with the audial experience of a character, object, or listener at the location in the scene of the visual entertainment medium. By way of example, the sound package includes, but is not limited to, one or more of the following: sound recorded or captured at, or at the location and orientation in the scene of, the selected character, object, or location; sound generated, processed, and/or convolved and/or altered by computation for the selected character, object, or location, or for the listener at the location and orientation in the scene of the selected character, object, or location; a subset of the sound sources or soundtracks of the scene that would be audible at the location in the scene of the selected character, object, or location; sound already convolved as binaural sound for the listener; information, instructions, or data to convolve sound for the listener; coordinates of emanation of the sound within the scene and other information to enable selection of a HRTFs of a listener so sound is convolved with a set of transfer functions, ITDs, or ILDs to enable the sound to emanate from the desired locations; time-coded positional trajectories for a selected character or object that moves within the scene or visual entertainment medium; ITDs, ILDs, transfer functions (e.g., HRTFs) or impulse responses (e.g., HRIRs) and their variations over time in the scene or entertainment to convolve or adjust each sound audible from the position in the scene of the selected character, object, or location so the sounds resulting from the adjustments emanate for the listener as if the listener were at the point-of-view and orientation of the character, object, or location in the scene during the scene(s); distances to characters or sound sources in a scene (e.g., distances from the camera, and/or actual distances from a viewer to a screen or display, and/or perceived distances from a viewer to an object, character, or sound source in a scene); an intensity or loudness of the sound; a direction or location of the sound (e.g., angles (0, @)), ITDs, ILDs, transfer functions (e.g., HRTFs) or impulse responses (e.g., HRIRs), and other information used to convolve sound.

Block 320 states provide the visual entertainment medium to the listener with binaural sound adjusted according to the sound package so the listener hears the sounds as if the listener were the selected character or object, or at the selected location in the scene of the visual entertainment medium.

By way of example, the binaural sound is provided to the listener through electronic earphones, headphones, or speakers (such as speakers included in a wearable electronic device or speakers that play sound processed for crosstalk cancellation).

Consider an example in which a listener decides to watch a feature length movie or film and selects or is designated to experience the audio of the movie as the main character in the film. When other characters speak to the main character, the listener hears the voices in binaural sound. These voices originate from locations relative to the main character. For instance, if another character is to the right of the main character, then the listener hears the voice of the other character as originating to the right of the listener. If the other character is in front of the main character, then the listener hears the voice of the other character in front of the listener. The listener thus hears the voices at the relative locations where the main character hears the voices. In this manner, the listener is an audio participant in the film since the listener hears the sounds from the first-person point-of-view of an actual character or person in the film.

When the listener of the example above is hearing sound from the point-of-view of the main character, the audio point-of-view selected, then the voice of the main character can be provided to the listener at a close proximate localization to the listener, or in mono sound or stereo sound. For example, a character is selected as the audial point-of-view for a listener, and the binaural sound of the voice SLP of the character is localized by a convention at, for example, near to and above the head of the listener (e.g., a position at which other sounds are rarely localized). The angle of source emission of the SLP of the voice is set to an angle between −10° and −60° elevation (e.g., as if the head of the character were atop the head of the listener and looking slightly downward). By using this example convention for localization of an SLP of an assumed character, the listener interprets or realizes his or her position as in or at (the neck or torso area of) the character. Such a convention further allows the listener to hear the speech of the character intelligibly, and to experience a realistic angle of emanation when the character speaks to other characters positioned within three meters. Further, the SLP of the voice of a character can be located independently of the audial point-of-view of the character. For example, a listener hearing the audial point-of-view of a character who is five feet tall hears the sound from the point-of-view of the head of a standing character at five feet above the floor, but the SLP for the voice of the character is away from or higher than five feet.

The listener can be provided with a list or identity of different characters, locations, or objects in the visual entertainment that are available as audial points-of-view. When the listener selects or is provided with the audio at one of these characters, locations, or objects, then the listener hears sounds from the point-of-view of the selected or provided character, location, or object. For example, a list of the characters, locations, or objects is displayed to the listener. As another example, characters, locations, or objects that are available as listening positions are identified in the visual entertainment (e.g., visually distinguished or identified before or during the visual entertainment). For instance, such characters, locations, or objects are highlighted, their sound distinguished, provided with an identifying color, provided with a mark or cue, identified with text, identified with indicia, etc.

When a listener selects or is provided a character, object, or a location then the listener hears sounds from the point-of-view of that character, object, or location. In some instances, however, the selected or provided character, object, or location may not be present in the scene of the visual entertainment medium. For instance, this situation would occur when a listener selects to be an audio participant of a character but the character is not present in a scene or a part of a duration of a scene being watched by the listener.

Example embodiments solve this problem by switching sound, switching characters, or switching locations. For instance, sound is switched from being provided as binaural sound to being provided as stereo sound or vice versa. As another example, the designated character, object, or location for the audial point-of-view of the listener is changed. An electronic system or the listener changes the audial point-of-view of the listener during the visual entertainment to different positions in the scene, such as from one character to another character, from one character to a location, from a location to an object, from one location to another location, etc. Switches can also occur from binaural sound to stereo or mono sound, and from stereo or mono sound to binaural sound. For instance, the electronic system switches the listening location from tracking a character in the scene to a particular stationary point in the scene (such as a "fly on the wall").

Consider an example in which the listener hears sounds from a point-of-view of a character in a movie, game, or software application or program. The source or location of sounds that the listener hears is determined by the orientation of the character (e.g., the orientation of the face of a character who is a person). The source or locations of sounds are determined by the camera angle or shot selection since the camera provides the point-of-view of a character, or the camera is considered a character, in a movie, game, or software application or program.

If the listener chooses or is provided another location as the audial point of perception, or point-of-view then the listener can select or be provided with the listening orientation (e.g., a listener who chooses the location of a "fly on the ceiling" can select a listening orientation normal to the ceiling or facing directly downward). A listener can select or be provided with a trajectory of audial points-of-view through the progress of the visual entertainment. For example, a listener selects or is provided with a point-of-view of "good guys" or "bad guys" or "aerial view" to automatically hear the audial point-of-view of heroes or villains or of floating above a scene. The audial point-of-view of the listener moves from one point or location in a scene to another point or location in the scene, and these movements occur during the scene, such as occurring in real-time while the scene is being displayed to the listener. As another example, a listener pauses the visual entertainment medium, changes the audial viewpoint, and resumes the visual entertainment medium. The listener re-views or "rewinds" the visual entertainment medium, selects a different location and/or orientation in a scene, such as to hear sounds of interest more clearly, and re-plays the scene of the visual entertainment medium. Further, a listener can be provided with a visual indication of which object, character, or location is serving as the audial point-of-view of the listener. For instance, when the listener hears sounds from the point-of-view of a selected character, then a visual indication on the character, screen, or display indicates for the listener which character is currently selected as the audial viewpoint.

Consider an example in which the listener hears sounds from a point-of-view of a character, object or a location in a movie or game. The location, character or object can be moving or fixed. This point-of-view is designated to be fixed at a certain location, character, or object in the scene, or is designated to track or follow at a certain character or object in the scene. To deliver binaural sound to the listener, one or more sound sources in the scene are convolved with a left and a right HRTF corresponding to the coordinates of the sound source relative to the designated point-of-view. If the position and orientation of the point-of-view is coincident with the camera then the localization of the sounds are adjusted to match the location of the images of sound sources as seen on the screen or display. The point-of-view can be positioned at a recognized viewpoint (e.g., the object or location has an eye, lens, face, or front), or at a point in space at a scene, within or inside hollow or solid objects at the scene, or at or beyond the bounds of a scene (e.g., at a theater seat where a filmed stage play is the entertainment, beyond a wall or geography of a scene where no action of scene exists, or from a point in a dimension higher than the dimensions occupied by the scene such as an aerial view of a flatland). As a character, location or object moves on the screen or the point-of-view designated for the listener moves, then the sound moves as well, relative to the listener. The sound that the listener would hear if the listener were present at the character, location, object, or point included in a scene can be captured, replicated, modified, adjusted or created using microphones, virtual microphone points (VMPs), convolution, filtering, summing, muxing or multiplexing, and other digital signal processing.

Figure 4:
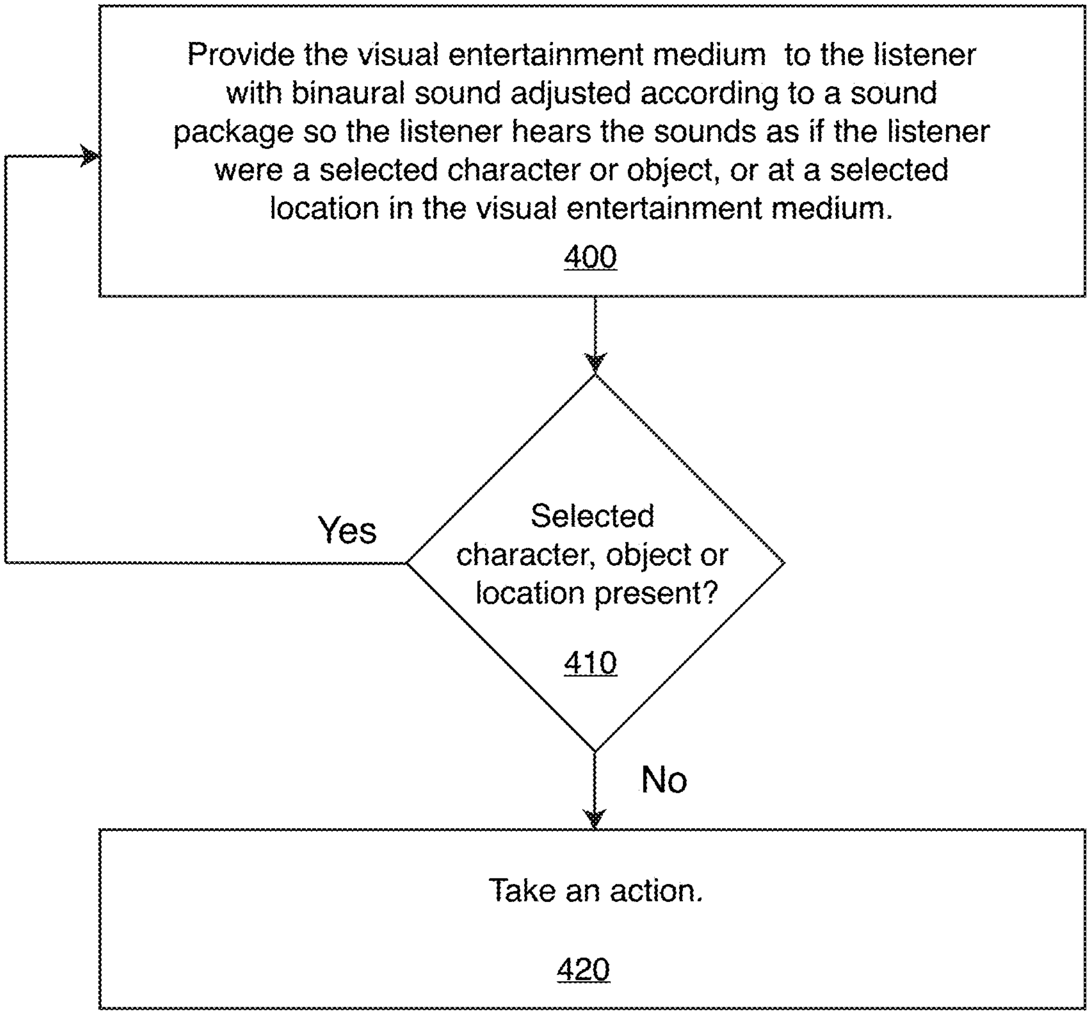
FIG. 4 is a method to take an action when a selected character or location is or is not present in a visual entertainment medium in accordance with an example embodiment.

FIG. 4 is a method to take an action when a selected character or location is or is not present in a visual entertainment medium in accordance with an example embodiment.

Block 400 states provide the visual entertainment medium to the listener with binaural sound adjusted according to a sound package so the listener hears the sounds as if the listener were a selected character or object, or at a selected location in the visual entertainment medium.

Sound packages as discussed in block 310 allow provision of sounds that are recorded or customized for the point-of-view of the selected character, object, or location.

Consider an example in which the listener hears sounds from the point-of-view of the character. The listener hears the sounds emanating from locations that are the same or similar to those that would be heard by the character. For example, if a voice occurs behind the character at distance (D) and angles ($\theta$, $\phi$), then the listener hears this voice as occurring behind the listener at distance (D) and angles ($\theta$, $\phi$). Additionally, the listener hears the sounds with a same intensity or loudness that would be heard by the character or at the position of the character. For example, if the character would hear the sound as a whisper or faint sound, then the listener hears the sound as a whisper or faint sound. In this way, the listening experience of the listener emulates or copies the listening experience that would be perceived at the location of the character.

Block 410 makes a determination as to whether the selected character, object, or location remains present in the visual entertainment medium.

If the answer to this determination is "yes" then flow proceeds to block 400, and binaural sound continues to be provided to the listener from the point-of-view of the selected character, object or location.

If the answer to this determination is "no" then flow proceeds to block 420 that states take an action.

Example actions include, but are not limited to, switching the sound from binaural sound to stereo sound or mono sound, switching the character, object, or location so the point-of-view for sound being provided to the listener remains in the current visual and/or audio space of the visual entertainment medium, moving the SLP or the sound to originate from a different location, changing a loudness of the sound, stopping the sound, and adjusting the sound with different HRTFs or ITDs or ILDs.

Consider an example in which the visual entertainment is a physical gallery with a visually augmented three-ring circus performing. Listeners enter the gallery wearing electronic glasses in order to see the AR circus performers in the gallery, and wearing earphones in order to hear the performers in binaural sound. The computer system or electronic system providing the binaural audio to the listeners tracks the location and orientation of the head of each of the listeners in order to provide individually adjusted audio so that listeners strolling in the gallery hear the sounds of the circus performers from the same location where they see the AR image of the performers.

Sound from legacy visual entertainment prerecorded in stereo can be localized to listeners, such as by creating a 3D model of the scene or audial space in order to position the listener in a selected audial point of view.

Consider an example where an electronic system processes for binaural output a movie in which characters Andre and Wally have a conversation at a table, with a violin player in the background. Andre sits at the table on the left side of the video frame while Wally sits across from Andre toward the right side of the frame. An audio diarization system segments the soundtrack of the film into a segment soundtrack for the voice of Andre, a segment soundtrack for the voice of Wally, and a segment soundtrack for the music of the violin. Sound source locations within each scene are assigned to the three segments by analyzing the video images and the signals in the stereo soundtrack. For example, by analyzing a long-shot of the three actors, evaluating the size of the images of their bodies or faces, detecting the timing of motion of their mouths and motion of the violin bow, and corresponding the motion with the weight of the sounds of the character in the stereo pan, the electronic system determines that Andre and Wally are approximately four feet apart, that the violin player is approximately ten feet beyond the table approximately equidistant from Andre and Wally, and that the three characters are seated with sound emanating from or near their heads at approximately three feet above the floor. Alternatively, this information is encoded manually, entered during sound development in post-production, entered or determined during editing, or determined another way (e.g., with object recognition). This positional information is evaluated in real-time or prior to viewing the movie, and the encoding is accomplished by a producer of the entertainment or by a device or process controlled or triggered by the viewer. With this information an audial space is modeled with the sounds of the characters placed according to their positions in the scene, with Andre's voice at (0, 3 ft, 0), Wally's voice at (4 ft, 3 ft, 0), and the violin music at (2 ft, 3 ft, −10 ft). A listener then selects a point and orientation of listening within the scene (e.g., by designating a selection of a character, object, or position in the frame), and the three sound segments are convolved or rendered according to their position relative the selected point and orientation.

Consider the example above where the electronic system creates a 3D model of the scene including the determination of the coordinates of the three characters or sound sources. The electronic system is in communication with the home TV of the viewer that outputs the video and the WED of the viewer that outputs the sound and provides the electronic system with the head-tracking data of the viewer. Consider an alternative example where the viewer also sits in his home and watches the movie on his TV screen, but the movie is broadcast from a local television station, and the electronic system is not in communication with the TV. Instead, the electronic system is included with or in communication with the PED of the viewer. The PED provides head-tracking data to the electronic system. The viewer routes the audio of the movie to his PED (e.g., via Bluetooth) for the PED to analyze, segment, process, convolve, and play the sound of the movie to the viewer. The viewer routes the video of the movie to the PED so that the PED analyzes the video in order to determine screen locations of characters or sound sources, and so that the electronic system can map or translate the head orientations of the viewer as the viewer faces the TV to screen coordinates of the movie. For example, the video is routed to the PED with a HDMI video cable, via a wireless radio connection, wireless HDMI connection, or via a camera included in the PED. For example, the viewer places the PED in a stationary position for the duration of the movie, with the lens of the camera of the PED facing the TV screen, and the electronic system analyzes the video being displayed across the room on the screen of the TV. The electronic system retrieves or creates a 3D model of the scene or scenes of the movie including the coordinates of the characters, sound sources, and points-of-view, by executing one or more of the methods discussed herein (e.g., image analysis, object recognition, and photogrammetry). The electronic system refers to the model and the head-tracking data of the viewer in order to calculate the coordinates of the SLPs of the characters or sound sources. The electronic system then convolves the sound from the characters or sound sources with HRTF pairs of the viewer that correspond to the SLPs in order to provide three-dimensional sound to the viewer as the viewer watches the movie played on the TV.

Figure 5:
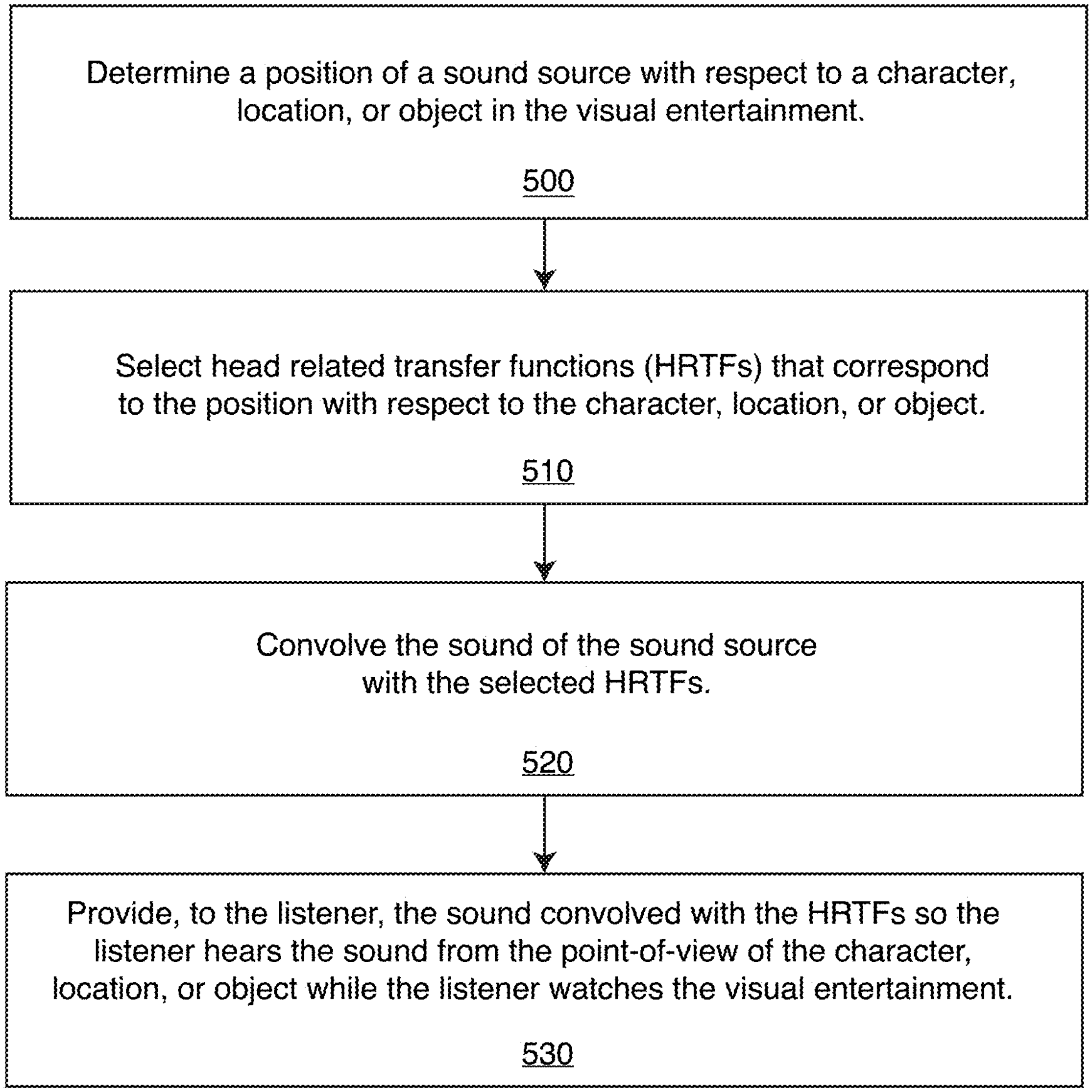
FIG. 5 is a method to provide binaural sound to a listener from a point-of-view of a character, location, or object in visual entertainment while the listener watches the visual entertainment.

FIG. 5 is a method to provide binaural sound to a listener from a point-of-view of a character, location, or object in visual entertainment while the listener watches the visual entertainment.

Block 500 states determine a position of a sound source with respect to a character, location, or object in the visual entertainment.

By way of example, the position includes one or more of azimuth angle, elevation angle, distance, relative coordinates or positions with respect to each other, a general description of position (e.g., left, right, in front, above, below, or behind) and distance.

This position can be determined with respect to an orientation of the object or character such as a gaze or line-of-sight of the character, a head orientation of the character, a point-of-view of the character, a point-of-view of an object with the character (e.g., a point and orientation of a firearm that the character holds), etc.

Block 510 states select head related transfer functions (HRTFs) that correspond to the position with respect to the character, location, or object.

The position provides information for the sound from the sound source to be convolved or processed so the sound is heard to originate at the correct location with respect to the character, location, or object and/or listener. For example, if the position with respect to the character and the source of sound is (2.0 m, 45°, 90°), then left and right HRTFs are obtained based on this information so the sound emanates from the sound source to the location and orientation of the character or location in the scene and/or listener.

Instead or in addition to the HRTFs, other information can be obtained including, but not limited to, HRIRs, ITDs, ILDs, a sound file or source, a soundtrack identifier, a trajectory, or other information discussed in connection with a sound package.

Block 520 states convolve the sound of the sound source with the selected HRTFs.

A processor (such as a digital signal processor or other type of processor) convolves or processes the sound with the selected HRTFs so the sound is heard by the listener to originate from the source of sound relative to the position in the scene assumed by the listener.

Block 530 states provide, to the listener, the sound convolved with the HRTFs so the listener hears the sound from the point-of-view of the character, location, or object while the listener watches the visual entertainment.

The sound is processed or convolved with a transfer function or other data so the sound originates to the listener from the direction and distance of the sound source in the scene relative to a position of the selected character, object, or location in the scene.

Speakers or earphones or headphones with or coupled to a wearable electronic device, another electronic device (such as a smartphone or laptop computer), or other speakers (such as speakers that play sound processed for crosstalk cancellation) provide the sound to the listener.

Consider an example in which a listener plays a VR game called "Special Forces Combat" while wearing a head-mounted display (HMD) that includes earphones and head tracking. In the game, the listener is a Special Forces character that carries out combat missions in a VR world. The listener sees the VR world through the HMD from the point-of-view of the selected Special Forces characters. Sounds of gunfire, explosions, voices, and other sounds originate from their respective locations in the VR game so the listener believes or perceives (from an audio perspective) that he or she is located in the VR world. In order to accomplish this audio experience, the computer system or electronic system selects the HRTFs for convolution based on azimuth and elevation angles of the line-of-sight or head orientation of, and a distance from, the character or player relative to the source of sound in the VR game. In this manner, sounds in the VR game appear to the listener to originate from their respective locations that coincide with where the listener sees the character or object of the sound source.

Consider an example in which a listener watches a movie and hears sounds from the point-of-view of a character in the movie. During a particular scene in the movie, a camera provides the point-of-view of the character so the listener sees on the screen or display what the character sees. At this point in time, sounds from characters in the scene are convolved or processed so that the sound of each character appears to originate from the directions of the characters seen on the screen or display.

Figure 6:
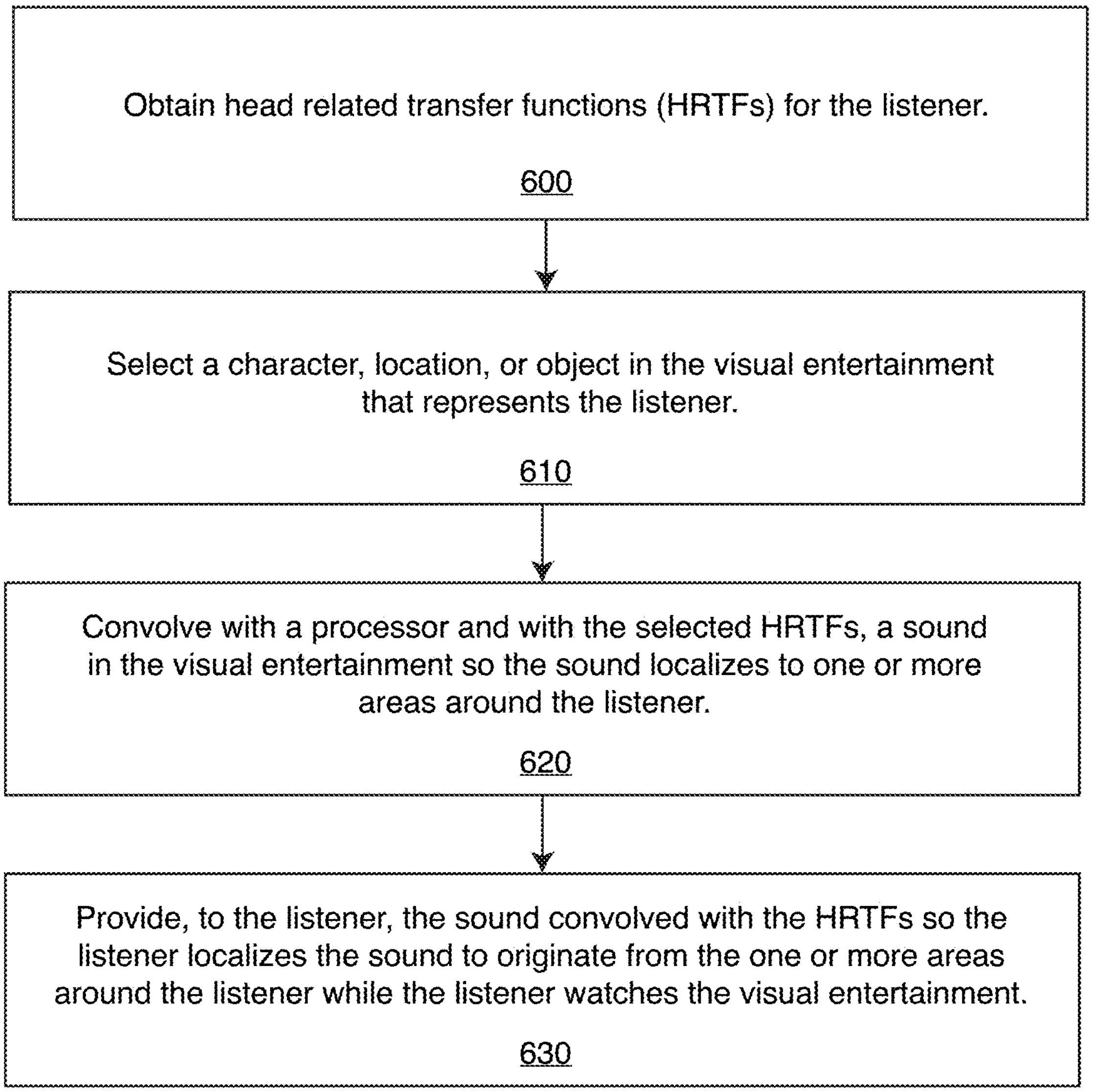
FIG. 6 is a method to provide binaural sound to a listener while the listener watches visual entertainment so sounds from the visual entertainment localize to one or more areas around the listener.

FIG. 6 is a method to provide binaural sound to a listener while the listener watches visual entertainment so sounds from the visual entertainment localize to one or more areas around the listener.

Block 600 states obtain head related transfer functions (HRTFs) for the listener.

For example, the HRTFs are retrieved from memory, obtained from captured HRIRs, interpolated, and/or processed in real-time.

As noted herein, example embodiments are not limited to HRTFs but include other transfer functions or information, such as discussed in connection with a sound package. Furthermore, the binaural sound can be captured at the time of recording so that it is ready to provide and localize to the listener, such as capturing binaural sound with dual, spaced microphones in ears of a dummy head or real person.

Block 610 states select a character, location, or object in the visual entertainment that represents the listener.

The selection of a character, object, or location can be executed or performed by the listener, another person, an electronic system, an intelligent personal assistant, an intelligent user agent, a software program, a process, hardware, or another action (such as being selected based on a current point-of-view or scene being displayed to or visualized by the listener).

Block 620 states convolve, with a processor and with the selected HRTFs, a sound in the visual entertainment so the sound localizes to one or more areas around the listener.

When sound is convolved with a left and right HRTF, then the sound originates to the listener to the relative location or coordinates associated with the transfer functions. If binaural sound is captured, then the sound originates from the relative location of the source of sound to the two microphones in the ears of the dummy head or person at the time of capture.

Areas around the listener include near-field locations (e.g., less than one meter), and far field locations. Examples of these areas include, but are not limited to, the following locations relative to the listener: left side, right side, in front of, behind, below, next to or beside (e.g., one meter or less), proximate to (e.g., zero to two meters), and above. Furthermore, these areas can be more precise, such as defined according to specific coordinates of $(r, \theta, \phi)$.

Block 630 states provide, to the listener, the sound convolved with the HRTFs so the listener localizes the sound to originate from the one or more areas around the listener while the listener watches the visual entertainment.

Consider an example in which a listener wears wireless earphones that communicate with his smartphone while watching a feature length movie in a movie theater. The movie theater includes a wireless transmitter that transmits sound of the movie to the smartphone while the movie plays. The smartphone, in turn, convolves the sound with the HRTFs of the listener in real-time while the movie plays so the listener hears the movie with binaural sound through the earphones.

Alternatively, the one or more soundtracks of the movie (such as a soundtrack for each sound source or speaking character) are streamed to the smartphone or audio convolver in advance of the playing of the sound, and cached so that convolution and sound adjustment are executed or carried out by the smartphone in advance of the playing of the sounds. For example, unprepared sounds are streamed to the phone and cached in an input buffer for convolution or processing. After processing, the processed sound is saved to an output buffer and played to the listener in synchronization with the time-code of the movie in progress.

Consider examples where SLP locations are not adjusted or compensated for changes in a location or head orientation of a viewer. For example, a location or head orientation of a viewer is fixed or minimized with respect to the visual display and compensation is not required. In such cases, convolution is preprocessed for a known head position relative to the screen or display. Examples of such cases in which the visual scene is fixed relative to the head of a viewer include, but are not limited to, one or more of the following: a movie presented stereoscopically to a viewer wearing a HMD (e.g., a head-mounted smartphone such as GOOGLE CARDBOARD) and without compensating for head-tracking data, a movie presented in AR as though projected on a plane in space that moves with the head of the viewer, a movie watched in a confined space that minimizes viewer head movement such as in a car or air passenger seat wherein the screen is mounted and fixed at an arm's length, a movie watched on a stationary handheld screen, or a viewing position where the seat accommodates a stationary head. In such viewing situations, binaural sound is provided to viewers of the visual entertainment medium using example embodiments, without the need for head tracking data, and allows convolution to be preprocessed or prepared for a viewer before the viewing of a scene.

For example, individual characters or sound sources move with the head of the listener by removing or disregarding the compensation calculation of the head-tracking data, or setting or providing constant values for the head-tracking adjustment for the sound source(s). As another example, one or more sound sources are selected to move with the head of the listener by the listener, another user, a computer program (e.g., IUA or IPA), or a device (e.g., WED or PED).

The audio from the point-of-view of an object or character with constant or jerky changes in orientation can be steadied for the benefit of the listener. For example, the audio point-of-view is slowed or smoothed using a variety of schemes to shift or move SLPs from a previous orientation or frame of reference toward a current or predicted orientation or frame of reference. For example, to reduce SLP movement for a listener due to erratic orientation of the point-of-view of the head of a character, the point-of-view is fixed to the chest of the character rather than the head of the character since the chest can have less changes in orientation than the head. As another example, a point-of-view fixed to an erratically moving body is further steadied by updating the point-of-view at a reduced interval and interpolating between one sampled, measured, or predicted point-of-view, and the next. As another example, a point-of-view is positioned at the rolling average position of a character over a duration (e.g., ten seconds). These or other methods are used to smooth or steady the perceived motion of SLPs that surround a character. By smoothing or steadying the motion of the SLPs, the listener is able to comprehend and maintain an audial reference of the positions of the moving SLPs.

A listener can manually freeze or steady a point-of-view, such as steadying the orientation of a point-of-view tracking a shaky character or a character with constant, frequent, or sudden changes in orientation. For example, a listener issues a gesture command to trigger ceasing azimuthal movement of, or to "lock down," a set of SLPs that do not move with respect to each other, but allowing movement of one or more SLPs that move independently of the set of SLPs that do not move with respect to each other. In addition, software monitoring SLP movement analyzes the SLP movement in order to recognize a threshold that determines that the point-of-view is changing too fast, too often, or too suddenly. If a threshold is reached, the point-of-view is triggered to steady or freeze in one or more dimensions or degrees of freedom in order to provide a more comfortable or comprehensible audial experience for the listener.

Consider an example in which a character Bob is being chased by a bear through a dense forest, and a viewer listens from the point-of-view of Bob. Heuristics are used to determine that Bob is in motion or his head orientation is unstable. For example, as Bob runs from the bear, each time he looks back at the bear, the roar of the bear has a significantly low ILD and ITD because the roar sound is near a zero azimuth. But Bob quickly turns ahead to continue running. If the duration of time that the roar sound has a significantly low ITD/ILD is repeatedly a fraction of a second, or if the sound source with the lowest ITD changes rapidly (indicating Bob is quickly looking from one sound source to another), then the computer system or electronic system determines that Bob's head is unstable. The computer system measures over time the momentary change of the point-of-view and if the stability falls below a threshold then a trigger is activated to stabilize the audial reference frame.

These and other methods disclosed herein are not limited to audio-visual media. For example, the electronic system analyzes and processes a radio drama or an audio recording of a stage play or movie sound-track in order to provide a listener with a three-dimensional audial experience.

A HRTF is a function of frequency (f) and three spatial variables, by way of example (r, θ, ϕ) in a spherical coordinate system. Here, r is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and ϕ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the sound source, the sound attenuates inversely with the distance. One meter or thereabout defines a practical boundary between near field and far field distances and corresponding HRTFs. A "near field" distance is one measured at about one meter or less; whereas a "far field" distance is one measured at about one meter or more. Example embodiments can be implemented with near field and far field distances.

The coordinates can be calculated or estimated from an interaural time difference (ITD) of the sound between two ears. ITD is related to the azimuth angle according to, for example, the Woodworth model that provides a frequency independent ray tracing methodology. The model assumes a rigid, spherical head and a sound source at an azimuth angle. The time delay varies according to the azimuth angle since sound takes longer to travel to the far ear. The ITD for a sound source located on a right side of a head of a person is given according to two formulas:

$$ITD=(a/c)[\theta+\sin(\theta)] \text{ for situations in which } 0\leq\theta\leq\pi/2\text{; and}$$

$$ITD=(a/c)[\pi-\theta+\sin(\theta)] \text{ for situations in which } \pi/2\leq\theta\leq\pi,$$

where θ is the azimuth in radians (0≤θ≤π), a is the radius of the head, and c is the speed of sound. The first formula provides the approximation when the origin of the sound is in front of the head, and the second formula provides the approximation when the origin of the sound is in the back of the head (i.e., the azimuth angle measured in degrees is greater than)±90°.

The coordinates (r, θ, ϕ) can also be calculated from a measurement of an orientation of and a distance to the face of the person when the HRIRs are captured. These calculations are described in patent application having Ser. No. 15/049,071 entitled "Capturing Audio Impulse Responses of a Person with a Smartphone" and being incorporated herein by reference.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). This data can include one or more of time domain impulse responses (FIR filter coefficients), filter feedback coefficients, and an ITD value. This information can also be referred to as "a" and "b" coefficients. By way of example, these coefficients can be stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. This data can be arranged according to one or more standard or proprietary file formats, such as AES69 or a panorama file format, and extracted from the file.

The coordinates and other HRTF information can thus be calculated or extracted from the HRTF data files. A unique set of HRTF information (including r, θ, ϕ) can be determined for each unique HRTF.

The coordinates and other HRTF information can also be stored in and retrieved from memory, such as storing the information in a look-up table. This information can be quickly retrieved to enable real-time processing and convolving sound using HRTFs.

The SLP represents a location where a person will perceive an origin of the sound. For an external localization, the SLP is away from the person (e.g., the SLP is away from but proximate to the person or away from but not proximate to the person). The SLP can also be located inside the head of the person.

A location of the SLP corresponds to the coordinates of one or more pairs of HRTFs. For example, the coordinates of or within a SLP zone match or approximate the coordinates of a HRTF. Consider an example in which the coordinates for a pair of HRTFs are (r, θ, ϕ) and are provided as (1.2 meters, 35°, 10°). A corresponding SLP zone for a person thus contains (r, θ, ϕ), provided as (1.2 meters, 35°, 10°). In other words, the person will localize the sound as occurring 1.2 meters from his or her face at an azimuth angle of 35° and at an elevation angle of 10° taken with respect to a forward looking direction of the person.

Figure 7:
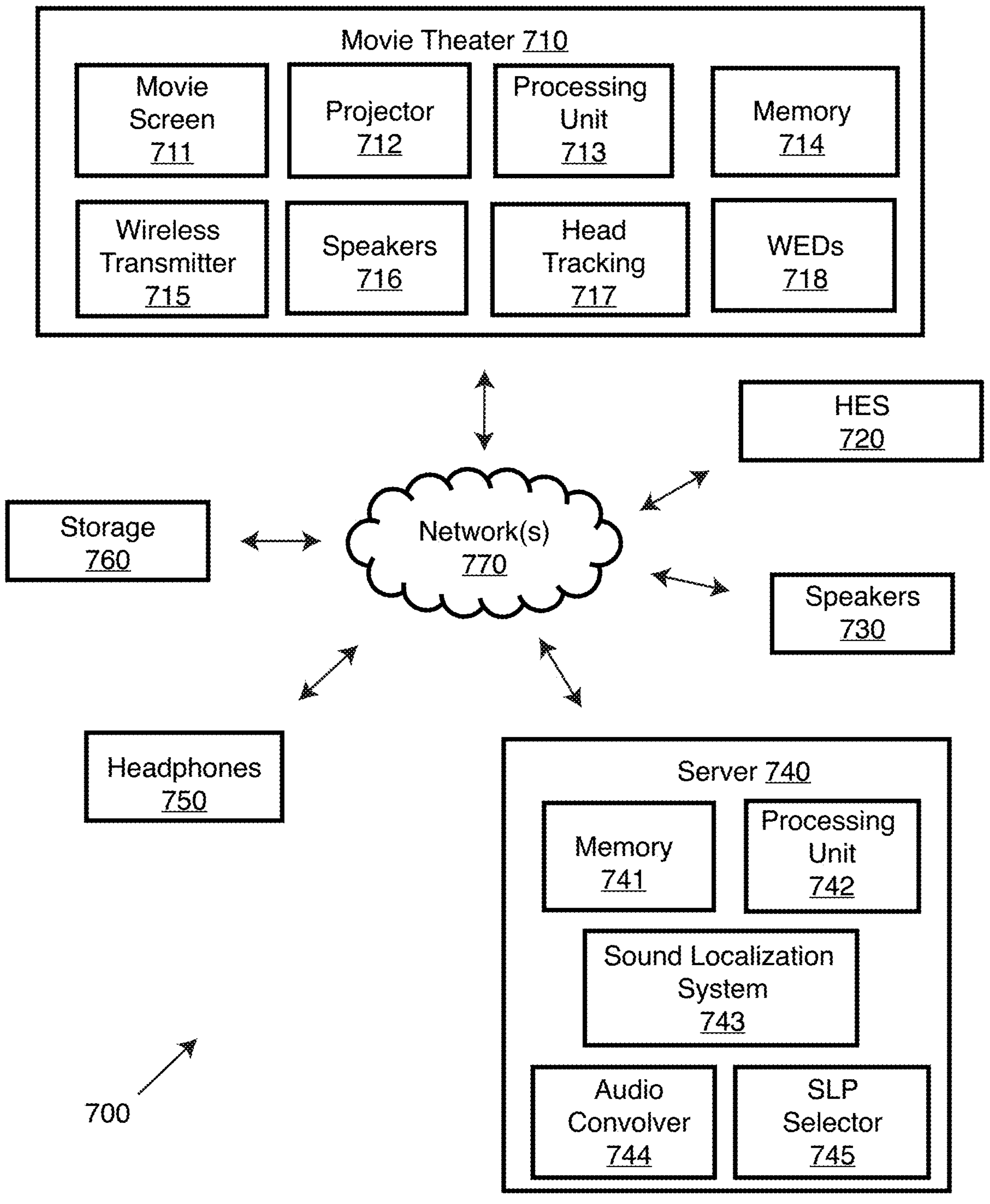
FIG. 7 is a computer system or electronic system in accordance with an example embodiment.

FIG. 7 is a computer system or electronic system 700 in accordance with an example embodiment. The system includes a movie theater 710, a home entertainment system (HES) 720, speakers 730, one or more servers 740, headphones 750 (such as wireless headphones or earphones), and storage 760 in communication with one or more networks 770.

The movie theater 710 includes one or more of a movie screen 711, a projector 712, a processing unit 713, memory 714, a wireless transmitter 715, speakers 716, head tracking 717, and wearable electronic devices 718.

The home entertainment system 720 can include one or more of a television, display, speakers, keyboard, pointing or selection device(s), and stereo.

The server 740 includes one or more components of computer readable medium (CRM) or memory 741, a processing unit 742 (such as one or more microprocessors and/or microcontrollers), a sound localization system (SLS) 743 (such as hardware and/or software to execute one more example embodiments), an audio convolver 744, and a sound localization point (SLP) selector 745.

The headphones 750 can be wired or wireless headphones or earphones and include other components, such as a left microphone, a right microphone, and head tracking.

The storage 760 can include memory or databases that store one or more of audio files or audio input, movies, television shows, SLPs (including other information associated with a SLP such as rich media, sound files and images), user profiles and/or user preferences (such as user preferences for SLP locations and sound localization preferences), impulse responses and transfer functions (such as HRTFs, HRIRs, BRIRs, and RIRs), and other information discussed herein.

The network 770 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct-wired connection. As another example, electronic devices can communicate directly through a wireless protocol, such as Bluetooth, near field communication (NFC), or other wireless communication protocol.

Figure 8:
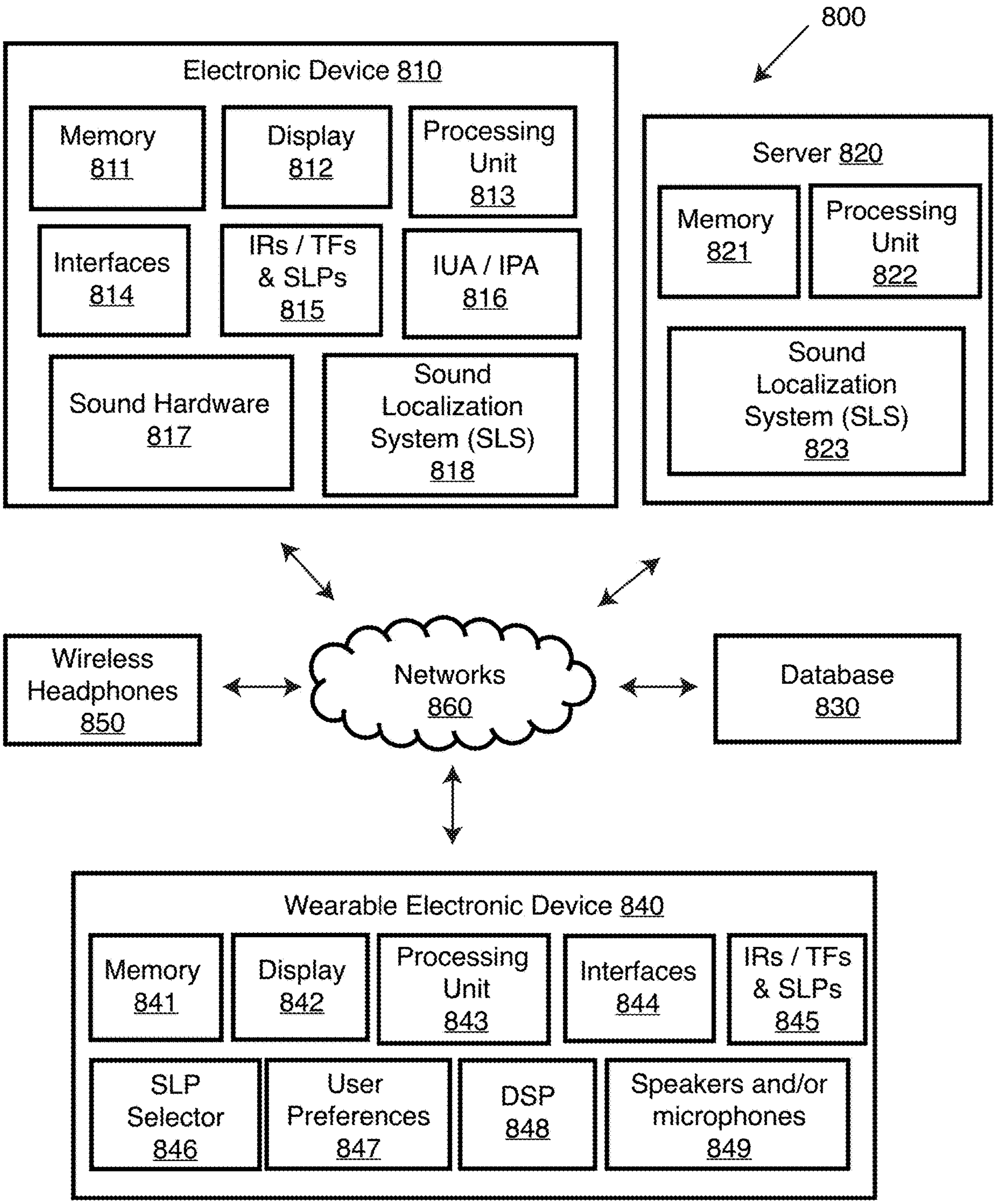
FIG. 8 is a computer system or electronic system in accordance with an example embodiment.

FIG. 8 is a computer system or electronic system in accordance with an example embodiment. The system 800 includes an electronic device 810, a server 820, a database 830, a wearable electronic device 840, and wireless headphones or earphones 850 in communication with each other over one or more networks 860.

Electronic device 810 includes one or more components of computer readable medium (CRM) or memory 811, one or more displays 812, a processor or processing unit 813 (such as one or more microprocessors and/or microcontrollers), one or more interfaces 814 (such as a network interface, a graphical user interface, a natural language user interface, a natural user interface, a phone control interface, a reality user interface, a kinetic user interface, a touchless user interface, an augmented reality user interface, and/or an interface that combines reality and VR), impulse responses (IRs), transfer functions (TFs), and/or SLPs 815, an intelligent user agent (IUA) and/or intelligent personal assistant (IPA) 816 (also referred to as a virtual assistant), sound hardware 817, and a sound localization system (SLS) 818.

The sound localization system 818 performs various tasks with regard to managing, generating, interpolating, extrapolating, retrieving, storing, and selecting SLPs and can function in coordination with and/or be part of the processing unit and/or DSPs or can incorporate DSPs. These tasks include generating audio impulses, generating audio impulse responses or transfer functions for a person, mapping SLP locations and information for subsequent retrieval and display (such as mapping them to visual entertainment), selecting SLPs when a user is watching visual entertainment, selecting SLPs and/or HRTFs per a head orientation of a listener, and executing one or more other blocks discussed herein. The sound localization system can also include a sound convolving application that convolves and deconvolves sound according to one or more audio impulse responses and/or transfer functions based on or in communication with head tracking.

Server 820 includes computer readable medium (CRM) or memory 821, a processor or processing unit 822, and a sound localization system 823.

The database 830 stores information discussed herein, such as movies and films, TV shows, games (such as VR games), user preferences, SLPs for users, audio files and audio input, transfer functions and impulse responses for users, etc.

Wearable electronic device 840 includes computer readable medium (CRM) or memory 841, one or more displays 842, a processor or processing unit 843, one or more interfaces 844, one or more impulse response data sets, transfer functions, and SLPs 845, a sound localization point (SLP) selector 846, user preferences 847, a digital signal processor (DSP) 848, and one or more of speakers and microphones 849.

By way of example, the sound hardware 817 includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier.

By way of example, an electronic device includes, but is not limited to, handheld portable electronic devices (HPEDs), portable electronic devices (PEDs), wearable electronic glasses, optical head-mounted displays (OHMDs), watches, wearable electronic devices (WEDs) or wearables, smart earphones or hearables, voice control devices (VCD), network attached storage (NAS), printers and peripheral devices, virtual devices or emulated devices, portable electronic devices, computing devices, electronic devices with cellular or mobile phone capabilities, digital cameras, desktop computers, servers, portable computers (such as tablet and notebook computers), smartphones, electronic and computer game consoles, home entertainment systems, handheld audio playing devices (example, handheld devices for downloading and playing music and videos), appliances (including home appliances), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP).

The SLP selector 846 receives audio input, user preferences, head orientation information, information about visual entertainment, and selects one or more SLPs, HRTFs, and/or RIRs for adjusting or moving the audio input, and provides as output the one or more SLP, HRTF and/or RIR selections and/or other information discussed herein. An example embodiment determines SLP placements and activations by considering a head orientation of a user relative to a device, relative to the body of a user, or relative to characters or objects or locations in a visual entertainment. By way of example, a selection of SLPs can be based on one or more of the scene or time-code in a scene or visual entertainment that the listener is watching or playing, sound source coordinates in the scene, a physical head orientation or position of a listener, and a virtual head orientation or position of a listener.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS or portions of the SLS include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which a wearable electronic device or handheld portable electronic device (HPED) includes a customized or dedicated DSP that executes one or more blocks discussed herein. Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or pre-fetch multiple data and/or instructions concurrently to increase execution speed and sound processing efficiency. By way of example, streaming sound data (such as sound data in a visual entertainment, such as a real-time network-based VR game) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector and/or the sound localization system. For example, the SLP selector, sound localization system, and/or the DSP are integrated onto a single integrated circuit die or integrated onto multiple dies in a single chip package to expedite binaural sound processing.

Consider another example in which HRTFs (or other transfer functions or impulse responses) are stored or cached in the DSP memory to expedite binaural sound processing.

Consider an example in which a smartphone or other HPED includes one or more dedicated sound DSPs (or dedicated DSPs for sound processing, image processing, and/or video processing). The DSPs execute instructions to convolve sound and provide sound corresponding to locations of sources of sound in a visual entertainment, such as voices of characters speaking, explosions, or other sounds. Further, the DSPs simultaneously convolve multiple SLPs to a user. These SLPs can be moving with respect to the face of the user so the DSPs convolve multiple different sound signals and sources with HRTFs that are continually, continuously, or rapidly changing.

In an embodiment in accordance with the invention, sound can be processed or convolved with transfer functions (such as HRTFs) that are specific or unique for a particular individual. Alternatively, these transfer functions can be generic. For instance, HRTFs can be compatible for many different people such that sound will accurately localize to external locations for different people. Further, binaural sound with example embodiments can be recorded, computer generated, or a mix of recorded and computer generated sounds. For example, binaural sound is captured with dual microphones placed on a dummy head or in the ears of an actor.

As used herein, a “scene” is portion of a film, video, game, or other visual medium. By way of example, a scene can take place at a single location or multiple locations, in a single setting or multiple settings, or at a set or filming location. A location in a scene is a location in or on the set or setting of a scene or sequence. For example, for an “alien cantina scene” portion of a movie that takes place inside a cantina on another planet, the interior space of the cantina is the scene or setting. The action of the scene takes place in the cantina. The cantina in the movie, on another planet, is not a place in the real world. The cantina was built at a movie studio and/or built from a 3D computer model or animated drawings. The movie studio and/or the 3D computer model or drawings are not the scene. A cantina patron with a bottle, seated on a bar stool at the cantina bar is a character in the scene. The cantina patron has and is a location in the scene. The bar stool is a location or position in the scene. The bottle is and has position and orientation (e.g., upright) in the scene. When the patron character drinks, a viewer of the entertainment sees the bottle move from a bar surface position and upright orientation, to a horizontal orientation and location in the scene at the mouth of the patron. The location and orientation of the bottle in the scene moves.

As used herein with respect to discussion of visual entertainment or other visual media, "camera" includes a visual point-of-view presented to a viewer. A point-of-view or camera has a position and orientation relative to and/or in a scene. A camera or point-of-view may or may not have a frame size and shape, or an aspect ratio (e.g., 3:4, 16:9). For example, a camera can be a 360° camera that presents a point-of-view to viewers from a center of a room, the location of the camera. Or, a camera can present a point-of-view that is limited by a frame so that only a part of a setting or scene is visible in the frame. For example, a camera or point-of-view presented to a viewer can be the result of photographically capturing a scene with a physical hardware movie or video camera positioned at the center of the movie set of a room of a scene for the shooting or capture of action in the room. As another example, the camera can be a virtual camera positioned and oriented with software in order to capture or create a view from the center of a room in a scene, the point-of-view. In both of these examples the camera or point of view has a position with respect to the scene (in the center of the room), and as such also has a location and orientation relative to, and a distance from, other things in the room or scene such as characters, walls, objects, etc.

As used herein, a "character" is person, creature, or being represented in a visual entertainment. Characters can be real, fictitious, animated, visible, or, invisible, and may interact with other characters, objects, or locations.

As used herein, "empty space" is a location that is not occupied by a tangible object.

As used herein, a "feature length movie" is a film or movie having a runtime of forty minutes or more. A feature length movie can include a television movie, direct-to-video movie, or a movie that premiers in a movie theater (e.g., a movie having a runtime of eighty or ninety minutes or more).

As used herein, a "point-of-view" is a position and orientation (e.g., a position and orientation in the world, in a virtual space, in a space or scene of a movie, TV show, game, VR game or environment, other visual entertainment, etc.).

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, a "user" is a person (i.e., a human being) and can be a software program (including an IPA or IUA), hardware (such as a processor or processing unit), an electronic device or a computer, or a robot.

As used herein, a "user agent" is software that acts on behalf of a user. User agents include, but are not limited to, one or more of intelligent user agents and/or intelligent electronic personal assistants (IPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, "visual entertainment medium" or "visual entertainment" includes, but is not limited to, one or more of movies, television shows or programs, video or computer games, AR games and AR environments, feature length movies, and VR games and VR environments.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:

displaying, with a head mounted display (HMD) worn on a head of a listener, a movie in a virtual three-dimensional (3D) room that includes a virtual movie screen that plays a movie with the listener appearing as a character in the movie;

processing, with one or more processors, sound of the movie with head-related transfer functions (HRTFs) so the sound of the movie externally localizes to the listener as binaural sound with sound localization points (SLPs) that occur at different locations on the virtual movie screen in the virtual 3D room; and playing, to the listener with the HMD, the movie on the virtual movie screen with the binaural sound so the listener hears the binaural sound as if the listener were the character in the movie on the virtual movie screen.

2. The method of claim 1 further comprising:

selecting, by a user agent and from different characters that appear in the movie, the character that the listener appears as in the movie.

3. The method of claim 1 further comprising:

determining, by the HMD, changes to head orientations of the head of the listener with respect to a location of the character in the movie; and selecting, by the HMD, the HRTFs so a voice of the character that the listener hears originates from the location of the character in the movie.

4. The method of claim 1 further comprising:

determining, by the HMD, a size and a shape of a room where the listener is located;

determining, by the HMD, room impulse responses (RIRs) based on the size and the shape of the room where the listener is located; and processing, by the HMD, the sound of the movie with the RIRs.

5. The method of claim 1 further comprising:

determining, with the HMD and from a gaze of the listener, azimuth and elevation coordinates of an object at which the listener is looking; and assigning HRTF pairs for convolution of the sound of the object based on the azimuth and elevation coordinates of the object at which the listener is looking.

6. The method of claim 1 further comprising:

receiving, at the HMD and from the listener, selection of the character from a plurality of different characters that appear in the movie.

7. The method of claim 1 further comprising:

processing, with the one or more processors, the sound of the movie so the sound localizes as the binaural sound to originate from a virtual character in the movie that is speaking to the listener appearing as the character in the movie.

8. A method comprising:

displaying, with a head mounted display (HMD) worn on a head of a listener, a virtual environment that plays a movie in which the listener appears as a character in the movie;

processing sound of the movie with the different pairs of head-related transfer functions (HRTFs) so the sound of the movie externally localizes to the listener as binaural sound at locations in the movie while the listener watches the movie in which the listener appears as the character in the movie; and playing the binaural sound to the listener from a point-of-view of the character in the movie such that the listener hears the binaural sound at the locations in the movie where the character hears the sound as if the listener were the character in the movie.

9. The method of claim 8 further comprising:

processing voices of characters that appear in the movie so that the voices of the characters localize to the listener as originating from images where the characters appear in the movie.

10. The method of claim 8 further comprising:

executing, by the HMD, ray tracing to render the binaural sound that plays to the listener with room impulse responses (RIRs).

11. The method of claim 8 further comprising:

receiving, from the listener and before the movie commences, selection of the character from a plurality of different characters in the movie.

12. The method of claim 8 further comprising:

tracking, with the HMD, head orientations of the listener with respect to a virtual image of a character that appears in the movie; and processing the sound of the movie so a sound localization point (SLP) of the binaural sound originates from the virtual image of the character as the virtual image of the character moves to different locations in the movie.

13. The method of claim 8 further comprising:

displaying, with the HMD, the movie on a virtual screen that appears in the virtual environment; and playing, with speakers in the HMD, voices of characters that appear in the movie such that the voices originate from locations of the characters that appear in the movie.

14. The method of claim 8 further comprising:

changing the HRTFs being processed with the sound of the movie in response to the listener moving to another seat while watching the movie in the virtual environment.

15. A head mounted display (HMD) comprising:

a display that displays a movie in virtual reality (VR) in which the listener is displayed as a character in the movie; and a processor that processes sound of the movie with head-related transfer functions (HRTFs) so the sound externally localizes to the listener as binaural sound in the movie, wherein the processor processes the sound of the movie so the listener hears the binaural sound from a point-of-view of the character in the movie as if the listener were at locations of the character in the movie as the character moves about in scenes in the movie.

16. The HMD of claim 15, wherein the listener selects, before the movie begins, the character from a plurality of different characters in the movie.

17. The HMD of claim 15, wherein the HMD displays a list of different characters in the movie that are available as audial points-of-view such that when the listener selects one of the different characters then the listener hears the binaural sound from a point-of-view of the one of the different characters that the listener selected.

18. The HMD of claim 15, wherein the processor executes instructions to maintain a sound localization point (SLP) to originate from another character that appears in the movie and speaks to the listener while a head of the listener moves.

19. The HMD of claim 15 further comprising:

head tracking that tracks head movements of the listener, wherein the HMD selects the HRTFs based on the head movements of the listener such that voices of other character appearing in the movie originate from locations of the other characters while a head of the listener moves.

20. The HMD of claim 15, wherein the HMD plays a voice of a narrator in the movie in stereo sound and plays voices of characters in the movie in the binaural sound.

* * * * *